United States Patent
Wu et al.

(10) Patent No.: US 11,079,511 B2
(45) Date of Patent: Aug. 3, 2021

(54) ANGULAR RESPONSE COMPENSATION FOR DAS VSP

(71) Applicant: HALLIBURTON ENERGY SERVICES, INC., Houston, TX (US)

(72) Inventors: Xiang Wu, Singapore (SG); Mark Elliot Willis, Katy, TX (US); Andreas Ellmauthaler, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 577 days.

(21) Appl. No.: 16/077,487

(22) PCT Filed: Jun. 28, 2017

(86) PCT No.: PCT/US2017/039823
§ 371 (c)(1),
(2) Date: Aug. 13, 2018

(87) PCT Pub. No.: WO2019/005050
PCT Pub. Date: Jan. 3, 2019

(65) Prior Publication Data
US 2021/0199832 A1 Jul. 1, 2021

(51) Int. Cl.
*G01V 1/50* (2006.01)
*G01V 1/30* (2006.01)
(Continued)

(52) U.S. Cl.
CPC ............ *G01V 1/50* (2013.01); *E21B 47/0224* (2020.05); *E21B 47/135* (2020.05); *G01V 1/307* (2013.01);
(Continued)

(58) Field of Classification Search
CPC .... G01V 1/50; G01V 1/307; G01V 2210/161; G01V 2210/47; G01V 2210/63;
(Continued)

(56) References Cited

U.S. PATENT DOCUMENTS 6,314,056 B1 11/2001 Bunn et al.
6,724,319 B1 4/2004 Knaack et al.
(Continued)

FOREIGN PATENT DOCUMENTS

CA 3064870 A1 1/2019
WO 2019005050 A1 1/2019

OTHER PUBLICATIONS

First Examination Letter issued for Canadian application No. 3,064,870, dated Mar. 10, 2021, 3 pages.
(Continued)

*Primary Examiner* — Kyle R Quigley
(74) *Attorney, Agent, or Firm* — Locke Lord LLP

(57) ABSTRACT

A system for processing DAS VSP surveys is provided. The system includes a DAS data collection system coupled to at least one optical fiber at least partially positioned within a wellbore and configured to either activate or passively listen to a seismic source of energy for one or more times. The system further includes an information processing system connected to the DAS data collection system. A seismic dataset is received from the DAS data collection system recorded in a spatiotemporal domain. The seismic dataset is converted into intercept-time ray-parameter domain dataset. Local apparent slope is determined for each seismic signal in the received seismic dataset. Amplitude correction is performed for the received seismic signals by using the slowness profile and the determined local apparent slope in the intercept-time ray-parameter domain dataset. The corrected intercept-time ray-parameter domain dataset is converted back into the spatiotemporal domain.

20 Claims, 12 Drawing Sheets

(51) Int. Cl.
  *E21B 47/0224* (2012.01)
  *E21B 47/135* (2012.01)
(52) U.S. Cl.
  CPC .... *G01V 2210/161* (2013.01); *G01V 2210/47* (2013.01); *G01V 2210/63* (2013.01)
(58) Field of Classification Search
  CPC ............. G01V 1/303; G01V 2210/614; G01V 2210/6161; G01V 2210/6222; E21B 47/0224; E21B 47/135
  See application file for complete search history.

(56) References Cited

U.S. PATENT DOCUMENTS

| | | |
|---|---|---|
| 8,755,643 B2 | 6/2014 | Nash et al. |
| 2004/0049349 A1* | 3/2004 | Wood .................. G01V 1/364 702/17 |
| 2011/0088462 A1 | 4/2011 | Samson et al. |
| 2012/0257475 A1 | 10/2012 | Luscombe et al. |
| 2013/0100788 A1 | 4/2013 | Freund et al. |
| 2013/0163376 A1* | 6/2013 | Poole ...................... G01V 1/38 367/24 |
| 2013/0163379 A1* | 6/2013 | Poole ...................... G01V 1/38 367/24 |
| 2014/0105533 A1 | 4/2014 | Jaaskelainen et al. |
| 2014/0150523 A1 | 6/2014 | Stokely et al. |
| 2014/0203946 A1 | 7/2014 | Skinner et al. |
| 2014/0204712 A1 | 7/2014 | Skinner et al. |
| 2014/0219056 A1 | 8/2014 | Samson et al. |
| 2016/0146661 A1* | 5/2016 | Martin .................. G01H 9/004 356/482 |
| 2016/0327670 A1* | 11/2016 | Wang .................. G01V 1/3808 |
| 2017/0031047 A1* | 2/2017 | Cheng .................. G01V 1/364 |
| 2017/0235006 A1 | 8/2017 | Ellmauthaler et al. |
| 2018/0095189 A1* | 4/2018 | Craft ..................... G01V 1/186 |
| 2018/0203147 A1* | 7/2018 | Paffenholz ............. G01V 1/288 |
| 2019/0086571 A1* | 3/2019 | Walker ..................... G01V 1/50 |

OTHER PUBLICATIONS

A. Mateeva, J. Lopez, H. Potters, J. Mestayer, B. Cox, D. Kiyashchenko, P. Wills, S. Grandi, K. Hornman, B. Kuvshinov, W. Berlang, Z. Yang, and R. Detomo, 2014, Distributed acoustic sensing for reservoir monitoring with vertical seismic profiling: Geophysical Prospecting, vol. 62, pp. 679-692.

B. Paulsson, 2012, Development of a 1,000 level 3C fiber optic borehole seismic receiver array applied to carbon sequestration: US Department of Energy, National Energy Technology Laboratory, Carbon Storage R&D Project Review Meeting DE-FE0004522.

B. Paulsson, 2013, Development and test of a 1,000 level 3C fiber optic borehole seismic receiver array applied to carbon storage: US Department of Energy, National Energy Technology Laboratory, Carbon Storage R&D Project Review Meeting DE-FE0004522.

Canales, 1984, Random noise reduction, 54.th. Ann. Internat. Mtg., Soc. Expl. Geophys., Expanded Abstracts, pp. 525-527.

J. A. Barfoot, 2013, Efficient Vertical Seismic Profiling using Fiber-Optic Distributed Acoustic Sensing and Real-Time Processing, Second EAGE Workshop on Borehole Geophysics.

M. D. Sacchi and M. Naghizadeh, 2009, Adaptive linear prediction filtering for random noise attenuation, SEG Houston 2009 International Exposition and Annual Meeting, Expanded Abstracts, pp. 3347-3351.

* cited by examiner

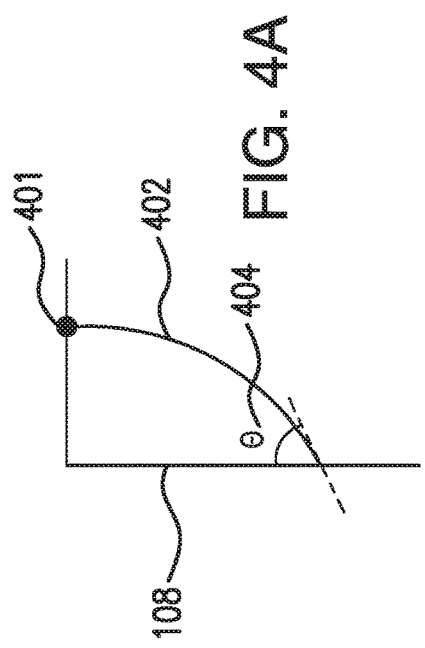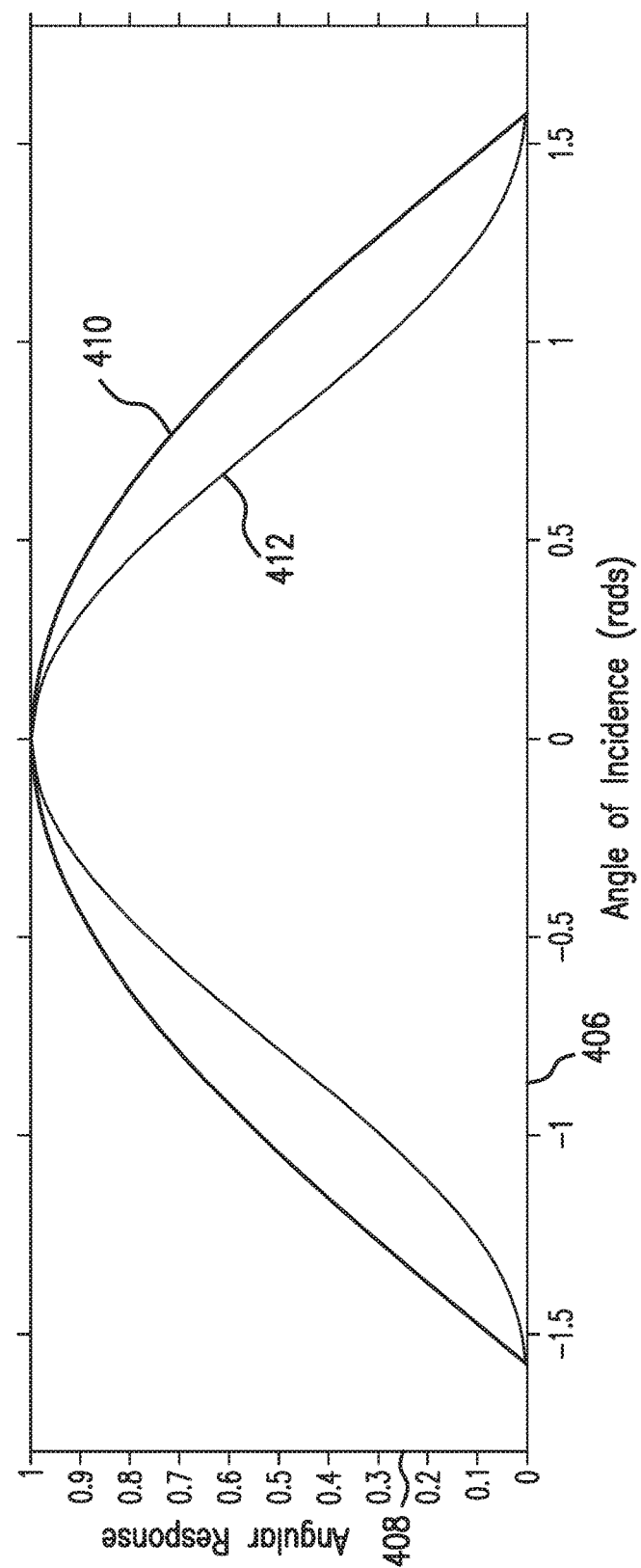
FIG. 4A
FIG. 4B

ANGULAR RESPONSE COMPENSATION FOR DAS VSP

TECHNICAL FIELD OF THE INVENTION

The embodiments disclosed herein generally relate to amplitude restoration of Vertical Seismic Profiling (VSP) surveys for formation evaluation and monitoring and, more particularly, to methods of real-time processing and controlling VSP surveys acquired using fiber optic-based Distributed Acoustic Sensing (DAS).

BACKGROUND OF THE INVENTION

Hydrocarbons, such as oil and gas, are commonly obtained from subterranean formations that may be located onshore or offshore. The development of subterranean operations and the processes involved in removing hydrocarbons from a subterranean formation are complex. Typically, subterranean operations involve a number of different steps such as, for example, drilling a wellbore through and/or into the subterranean formation at a desired well site, treating the wellbore to optimize production of hydrocarbons, and performing the necessary steps to produce and process the hydrocarbons from the subterranean formation. Some or all of these steps may require and utilize measurements and other sensed data to determine characteristics of the formation, the hydrocarbon, the equipment used in the operations, etc.

One example type of sensed data comprises seismic data in the form of VSP. VSP may refer to the measurement of seismic/acoustic energy in a wellbore originating from a seismic source at the surface of the wellbore (e.g., a vibrator truck, air gun, and/or explosives). In certain instances fiber optic-based DAS may be used to acquire the seismic data necessary to form the VSP. Acoustic sensing based on DAS may use the Rayleigh backscatter property of a fiber's optical core and may spatially detect disturbances that are distributed along a length of fiber positioned within a wellbore. As is well known in the art, the seismic amplitude of the geophysical DAS VSP data is distorted by various geophysical factors, such as, but not limited to, spherical divergence, scattering, reflection/transmission, attenuation, and the like, which all occur in the formation medium. In addition, the acquired seismic amplitude also suffers from the response of fiber optic cables, which are non-geophysical, and should be compensated before carry out any subsequent true amplitude processing.

The ability to compensate the response of fiber optical cables is of direct relevance to real-time and offline processing of DAS VSP data, particularly for real-time and offline processing integrated as a workflow. Accordingly, there is continued interest in developing improved survey control capable to recover seismic amplitude (i.e., from the distortion of the angular response) without additional hardware improvements and/or without additional operation efforts.

BRIEF DESCRIPTION OF THE SEVERAL VIEWS OF THE DRAWING

For a more complete understanding of the disclosed embodiments, and for further advantages thereof, reference is now made to the following description taken in conjunction with the accompanying drawings in which:

FIG. 4A illustrates an angle of incidence;

FIG. 4B illustrates the comparison of the p-wave amplitude response of incident angles of FIG. 4A for geophone and DAS recording systems;

FIGS. 10A-10D illustrate the approach to identify the incident angles in τ–p domain, and the computed incident angles with respect to the channel depth using a synthetic DAS VSP example, in accordance with embodiments of the present invention.

DETAILED DESCRIPTION OF THE DISCLOSED EMBODIMENTS

Figure 1:
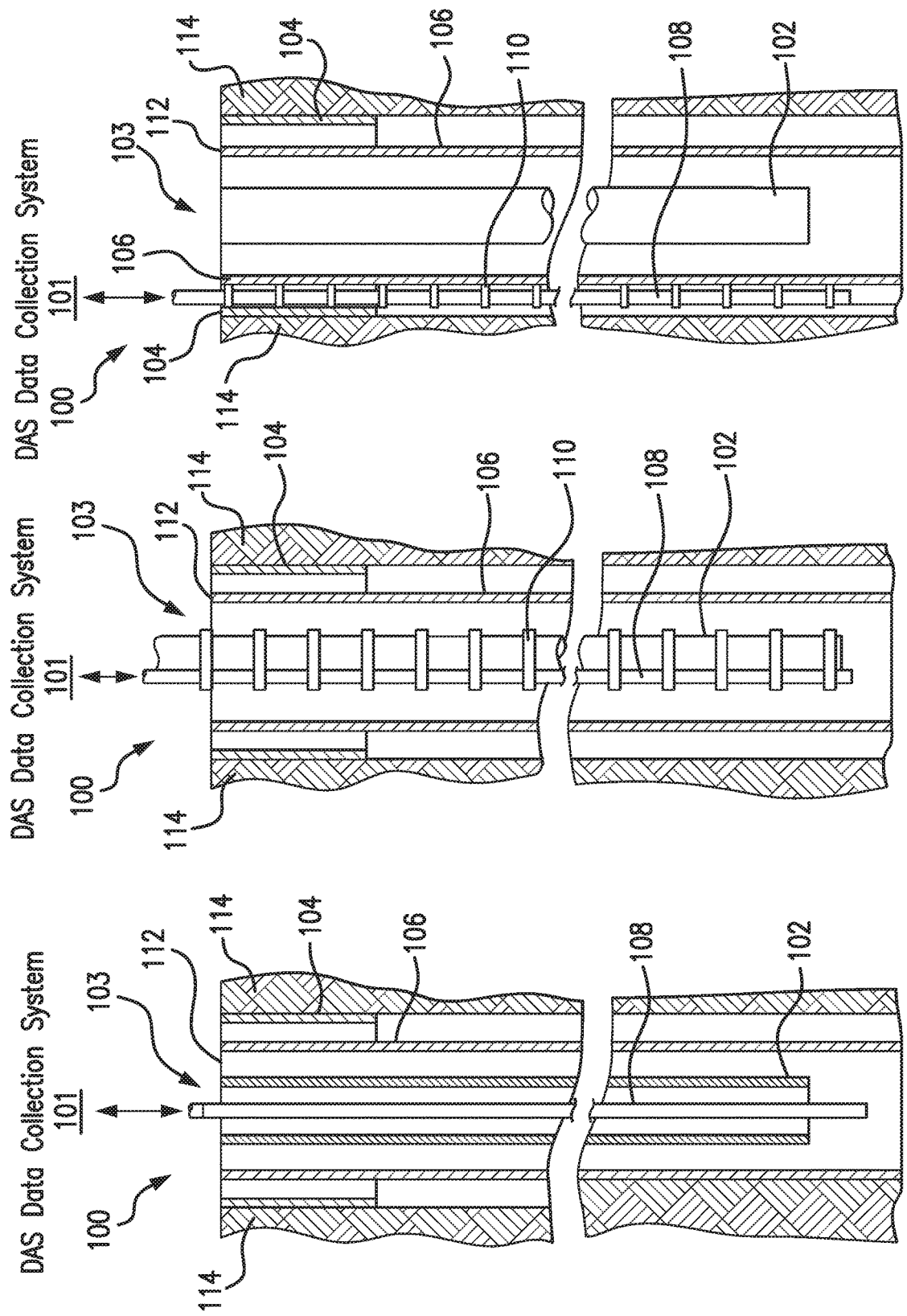
FIGS. 1A-1C show various illustrative examples of fiber-optic based DAS deployed in a wellbore according to the disclosed embodiments.

The following discussion is presented to enable a person skilled in the art to make and use the invention. Various modifications will be readily apparent to those skilled in the art, and the general principles described herein may be applied to embodiments and applications other than those detailed below without departing from the spirit and scope of the disclosed embodiments as defined herein. The disclosed embodiments are not intended to be limited to the particular embodiments shown, but are to be accorded the widest scope consistent with the principles and features disclosed herein.

The terms "couple" or "coupled" as used herein are intended to mean either an indirect or a direct connection. Thus, if a first device couples to a second device, that connection may be through a direct connection, or through an indirect electrical or mechanical connection via other devices and connections. The term "upstream" as used herein means along a flow path towards the source of the flow, and the term "downstream" as used herein means along a flow path away from the source of the flow. The term "uphole" as used herein means along the drill string or the hole from the distal end towards the surface, and "downhole" as used herein means along the drill string or the hole from the surface towards the distal end.

It will be understood that the term "oil well drilling equipment" or "oil well drilling system" is not intended to limit the use of the equipment and processes described with those terms to drilling an oil well. The terms also encompass drilling natural gas wells or hydrocarbon wells in general. Further, such wells can be used for production, monitoring, or injection in relation to the recovery of hydrocarbons or other materials from the subsurface. This could also include geothermal wells intended to provide a source of heat energy instead of hydrocarbons.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

For purposes of this disclosure, an information processing system may include any device or assembly of devices operable to compute, classify, process, transmit, receive, retrieve, originate, switch, store, display, manifest, detect, record, reproduce, handle, or utilize any form of information, intelligence, or data for business, scientific, control, or other purposes. Examples of well-known computing systems, environments, and/or configurations that may be suitable for use with the information processing system include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed data processing environments that include any of the above systems or devices or any other suitable device that may vary in size, shape, performance, functionality, and price. The information processing system may include a variety of computer system readable media. Such media may be any available media that is accessible by the information processing system, and it includes both volatile and non-volatile media, removable and non-removable media. The information processing system can include computer system readable media in the form of volatile memory, such as random access memory (RAM) and/or cache memory. The information processing system may further include other removable/non-removable, volatile/non-volatile computer system storage media, one or more processing resources such as a central processing unit ("CPU") or hardware or software control logic, and/or ROM. Additional components of the information processing system may include one or more network ports for communication with external devices as well as various input and output ("I/O") devices, such as a keyboard, a mouse, and a video display. The information processing system may also include one or more buses operable to transmit communications between the various hardware components.

As stated above, VSP may refer to the measurement of seismic/acoustic energy in a wellbore originating from a seismic source at the surface of the wellbore (e.g., a vibrator truck, air gun, and/or explosives), or that in another nearby wellbore (cross-well surveys). Traditionally, these measurements may be recorded by using a string of usually approximately equally spaced geophones and/or hydrophones. By using such equipment, it is typically possible to sample the seismic wave field at resolutions on the order of tens of meters. While hydrophones and geophones provide one-dimensional sensitivity (1C), they can be configured in pairs or triads for two- (2C) and three-dimensional (3C) sensitivity.

An alternate method of collection VSP data may include the use of DAS techniques. In DAS VSP collection methods, the expensive geophone string is replaced by a fiber optic cable that may be, for example, cemented into the wellbore wall behind tubing or casing, or be temporarily placed in the well (e.g., inside a retrievable wireline logging cable) with the drill string in place or removed from the wellbore. As a consequence, DAS VSP data collection techniques may allow for wellbore seismic monitoring during operations such as stimulation and production without intervention. In addition, DAS VSP data collection techniques may allow for the collection of data samples of the seismic wave field at resolutions on the order of a meter (as opposed to tens of meters with traditional geophones). Furthermore, DAS VSP data collection may occur over the entire well at one instant, as compared with geophones which are typically deployed in short arrays covering only parts of the well at any one time. However, in DAS approach the sensitivity constraint is a one dimensional sensitivity constraint. This one dimensional constraint can severely limit the scope of recovery of the amplitudes which are weakened by the angular response of DAS.

Embodiments disclosed here integrate the concept of real-time or offline data stream processing into one workflow that can recover the amplitude of seismic signals affected by the angular response for DAS VSP data set, providing improved survey control to be applied at different granularities. In particular, the method presented in this disclosure may be applied on geophone VSP data as well, but it would be less significant with geophone VSP data because there might be multi-dimensional geophone data available to the VSP data processing system enabling 3C processing methods that can best recover the amplitude of seismic signals affected by the angular response. Hence, various embodiments directed to the angular response recovery are described below with respect to DAS VSP data only. However, similar approach may be applied to both hydrophones and geophones VSP data as well. To facilitate a better understanding of the present disclosure, the following examples of certain embodiments are given. In no way should the following examples be read to limit, or define, the scope of the disclosure. Embodiments of the present disclosure and its advantages are best understood by referring to FIGS. 1A-1C through FIG. 12, where like numbers are used to indicate like and corresponding parts.

Embodiments of the present disclosure may be applicable to horizontal, vertical, deviated, multilateral, u-tube connection, intersection, bypass (drill around a mid-depth stuck fish and back into the wellbore below), or otherwise nonlinear wellbores in any type of subterranean formation. Certain embodiments may be applicable, for example, to logging data acquired with wireline and slickline. Certain embodiments may be applicable to subsea and/or deep sea wellbores. Embodiments described below with respect to one implementation are not intended to be limiting.

Turning now to the drawings, FIGS. 1A-1C show various illustrative examples of fiber-optic based DAS deployed in a wellbore 103 according to the disclosed embodiments. One or more tubulars are positioned within the wellbore 103 in a telescopic fashion. As depicted, the tubulars comprise a surface casing 104 and a production casing 106. In general casing is a tubular pipe, usually made of steel that preserves the integrity of the wellbore wall and wellbore 103. The surface casing 104 comprises the largest tubular and is secured in the wellbore 103 via a cement layer 114. The production casing 106 is at least partially positioned within the surface casing 104 and may be secured with respect to the surface casing 104 via a casing hanger (not shown) and a cement layer 114. The wellbore 103 further includes tubing 102 positioned within the production casing 106. Other configurations and orientations of tubulars within the wellbore 103 are possible.

A DAS system 100 may be deployed with the wellbore 103. The DAS system 100 may include, among other things a DAS data collection system 101 coupled to an optical fiber 108 that is at least partially positioned within the wellbore 103. In one embodiment, as depicted in FIG. 1C, the fiber 108 is positioned between the surface casing 104 and the production casing 106. The fiber 108 may be secured in place between the surface casing 104 and the production casing 106 by couplers 110 such that it functions as a "permanent" seismic sensor. In another embodiment, shown in FIG. 1B, the fiber 108 may be secured to the tubing 102, for instance, by the couplers 110. In some embodiments, the couplers 110 are cross-coupling protectors located at every other joint of the tubing 102. In yet another embodiment, depicted in FIG. 1A, the fiber 108 may be lowered into the wellbore 103 through the inner bore of the tubing 102 in a removable wireline or slickline arrangement, or positioned at any other suitable position.

It should be noted, any suitable number of DAS systems 100 may be placed adjacent to wellbore 103. With optical fiber 108 positioned inside a portion of wellbore 103, the DAS system 100 may receive or otherwise obtain seismic data based on disturbances caused by a seismic source (not shown) using, for example, a DAS interrogator unit at the surface of the wellbore (not shown). In one embodiment, the source of seismic energy is a vibrator which performs sweeping of a signal through a frequency range that includes a plurality of frequency bands. Some additional examples of seismic sources may include, but are not limited to, air guns, weight drops, accelerated weight drops, marine vibrators, mortar gun explosives (e.g., dynamite), thumper trucks, or any other suitable vibration source for creating seismic waves in formation. As will be described in detail below, the seismic data may correspond to changes in strain in the optical fiber 108 that are identified by detecting phase changes in backscattered light signals along the length of optical fiber 108.

Although not depicted in FIGS. 1A-1C, the disclosed DAS system 100 further includes an information processing system 200 (shown in FIG. 2) positioned at a surface 112 of the earth. The information processing system 200 may be communicably coupled to the DAS data collection system 101 through, for instance, a wired or wireless connection. The information processing system 200 may receive measurement in the form of seismic dataset from the DAS data collection system 101 and perform one or more actions that will be described in detail below. Additionally, the information processing system 200 may receive seismic dataset from a data center or storage server in which the seismic data received or otherwise acquired by the DAS data collection system 101 were previously stored.

Modifications, additions, or omissions may be made to FIGS. 1A-1C without departing from the scope of the present disclosure. For example, the DAS data collection system 101 and optical fiber 108 may be used during wireline or slickline logging operations before some or all of the tubulars have been secured within the wellbore 103, and/or before the wellbore 103 is completed. As another example, multiple seismic sources may be used in conjunction with the DAS system 100. Moreover, components may be added to or removed from the DAS system 100 without departing from the scope of the present disclosure.

Figure 2:
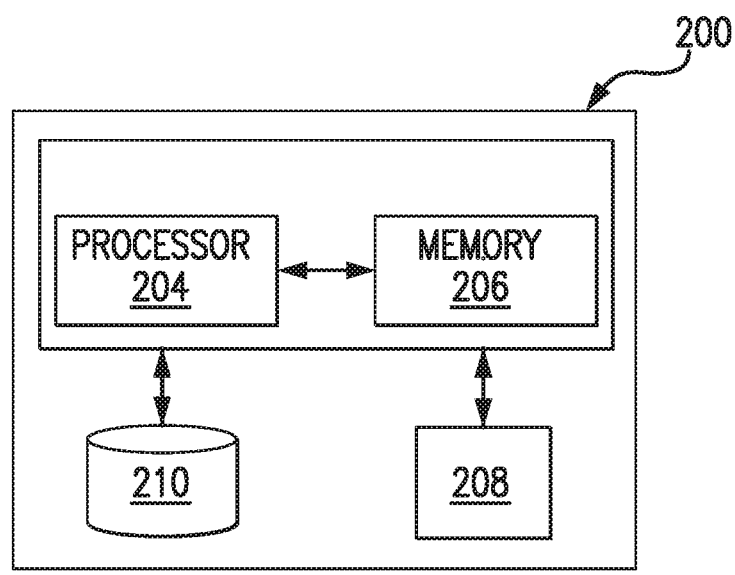
FIG. 2 illustrates a block diagram of an exemplary information processing system, in accordance with embodiments of the present disclosure.

FIG. 2 illustrates a block diagram of an exemplary information processing system 200, in accordance with embodiments of the present disclosure. The information processing system 200 may be configured to receive seismic datasets from a DAS system and perform one or more amplitude recovery methods that will be described in detail below. The information processing system 200 can be used with different drilling and logging systems positioned at different locations.

The information processing system 200 comprises a processor 204. Processor 204 may include, for example a microprocessor, microcontroller, digital signal processor (DSP), application specific integrated circuit (ASIC), or any other digital or analog circuitry configured to interpret and/or execute program instructions and/or process data. As depicted, the processor 204 is communicatively coupled to memory 206 and configured to interpret and/or execute program instructions or data retrieved and stored in memory 206. Program instructions or data may constitute portions of VSP survey control software module 208 for carrying out methods of VSP survey operation control, as described herein. Memory 206 may include any system, device, or apparatus configured to hold and/or house one or more memory modules; for example, memory 206 may include read-only memory, random access memory, solid state memory, or disk-based memory. Each memory module may include any system, device or apparatus configured to retain program instructions and/or data for a period of time (e.g., computer-readable non-transitory media). For example, instructions from the VSP survey control module 208 may be retrieved and stored in memory 206 for execution by processor 204. In an embodiment of the present disclosure, received seismic datasets acquired by a DAS system may be stored in database 210 for long-term storage. In certain embodiments, the information processing system may further comprise one or more displays or other input/output peripherals such that information processed by the information processing system 200 (e.g., seismic data from a DAS system) may be conveyed to operators of drilling and logging equipment.

Modifications, additions, or omissions may be made to FIG. 2 without departing from the scope of the present disclosure. For example, FIG. 2 shows a particular configuration of components of information processing system 200. However, any suitable configurations of components may be used. For example, components of information processing system 200 may be implemented either as physical or logical components. Furthermore, in some embodiments, functionality associated with components of information processing system 200 may be implemented in special purpose circuits or components. In other embodiments, functionality associated with components of information processing system 200 may be implemented in configurable general purpose circuit or components. For example, components of information processing system 200 may be implemented by configured computer program instructions.

Figure 3:
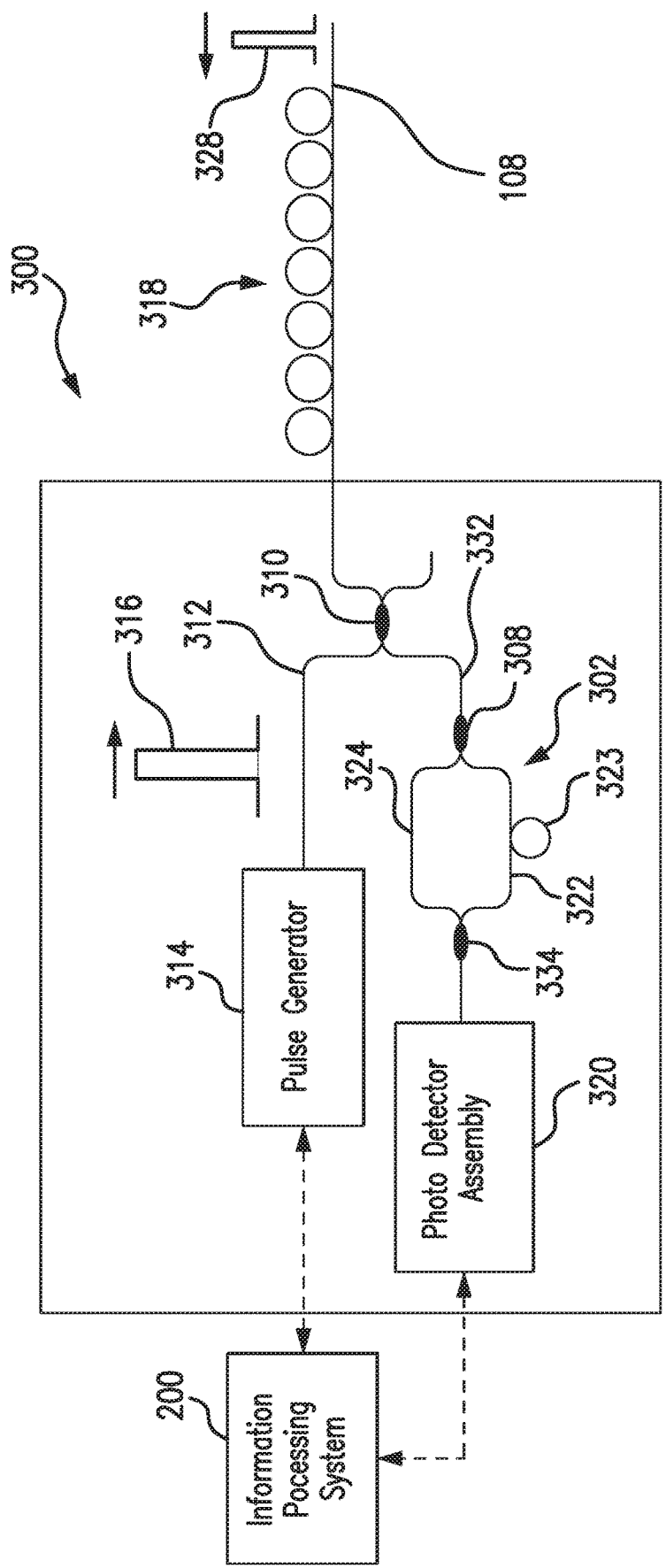
FIG. 3 illustrates an example system for processing DAS VSP surveys in real-time in accordance with particular embodiments of the present disclosure.

As mentioned above, the information processing system 200 may be communicatively coupled to the DAS data collection system 101. FIG. 3 illustrates an example of a DAS data collection system 300 that is specifically designed for processing DAS VSP surveys in real-time in accordance with particular embodiments of the present disclosure. The DAS VSP processing system 300 may be combined or otherwise incorporated into the DAS system 100 described above with reference to FIG. 1, with the optical fiber 108 at least partially positioned within the wellbore 103. The DAS VSP processing system 300 also may be incorporated into other drilling, logging, and completion systems that would be appreciated by one of ordinary skill in the art having the benefit of this disclosure. As will be explained, the DAS VSP processing system 300 may comprise a single-pulse coherent Rayleigh scattering system with a compensating interferometer, but is not intended to be limited to such. In particular embodiments, the DAS VSP processing system 300 may be used for phase-based sensing of events in a wellbore using measurements of coherent Rayleigh backscatter or may interrogate a fiber optic line containing an array of partial reflectors, for example, fiber Bragg gratings.

Referring to FIG. 3, the DAS VSP processing system 300 may comprise a pulse generator 314 coupled to a first coupler 310 using an optical fiber 312. The pulse generator 314 may be a laser, or a laser connected to at least one amplitude modulator, or a laser connected to at least one switching amplifier, i.e., semiconductor optical amplifier (SOA). The pulse generator 314 may be located at any suitable location when performing subterranean operations. For instance, in some embodiments, the pulse generator 314 may be located at the surface 112 of the wellbore 103. The first coupler 310 may be a traditional fused type fiber optic splitter, a circulator, a PLC fiber optic splitter, or any other type of splitter known to those with ordinary skill in the art having the benefit of this disclosure. The pulse generator 314 may be coupled to optical gain elements (not shown) to amplify pulses generated therefrom. Example optical gain elements include, but are not limited to, Erbium Doped Fiber Amplifiers (EDFAs) or Semiconductor Optical Amplifiers (SOAs).

The DAS VSP processing system 300 may comprise an interferometer 302. In some embodiments, the interferometer 302 comprises a Mach-Zehnder interferometer, but it is not intended to be limited to such. For instance, in certain implementations, a Michelson interferometer or any other type of interferometer known to those of skill in the art having the benefit of this disclosure may also be used without departing from the scope of the present disclosure. The interferometer 302 may comprise a top interferometer arm 324, a bottom interferometer arm 322, and a gauge 323 positioned on the bottom interferometer arm 322. The interferometer 302 may be coupled to the first coupler 310 through a second coupler 308 and an optical fiber 332. The interferometer 302 further may be coupled to a photodetector assembly 320 of the system 300 through a third coupler 334 opposite the second coupler 308. The second coupler 308 and third coupler 334 may be a traditional fused type fiber optic splitter, a PLC fiber optic splitter, or any other type of optical splitter known to those with ordinary skill in the art having the benefit of this disclosure. The photodetector assembly 320 may include associated optics and signal processing electronics (not shown). The photodetector assembly 320 may be a semiconductor electronic device that uses the photoelectric effect to convert light to electricity. The photodetector assembly 320 may be an avalanche photodiode or a pin photodiode but is not intended to be limited to such.

In operation of the system 300, the pulse generator 314 may generate a first optical pulse 316 which is transmitted through the optical fiber 312 to the first coupler 310. The first coupler 310 may direct the first optical pulse 316 through the optical fiber 108, which may be coupled to the first coupler 310. Although a linear deployment for the fiber cable is typical, different geometries may be used. For example, at least a portion of the optical fiber 108 may be arranged in coils 318. As the first optical pulse 316 travels through the optical fiber 108, imperfections in the optical fiber 108 may cause a portion of the light to be backscattered along the optical fiber 108 due to Rayleigh scattering. Scattered light according to Rayleigh scattering is returned from every point along the optical fiber 108 along the length of the optical fiber 108 and is shown as backscattered light 328 in FIG. 3. This backscatter effect may be referred to as Rayleigh backscatter. Density fluctuations in the optical fiber 108 may give rise to energy loss due to the scattered light, $\alpha_{scat}$, with the following coefficient:

$$\alpha_{scat} = \frac{8\pi^3}{3\lambda^4} n^8 p^2 k T_f \beta \qquad (1)$$

where n is the refraction index, p is the photoelastic coefficient of the optical fiber 108, k is the Boltzmann constant, and $\beta$ is the isothermal compressibility. $T_f$ is a fictive temperature, representing the temperature at which the density fluctuations are "frozen" in the material. The optical fiber 108 may be terminated with a low reflection device (not shown). In certain implementations, the low reflection device (not shown) may be a fiber coiled and tightly bent to violate Snell's law of total internal reflection such that all the remaining energy is sent out of the fiber.

The backscattered light 328 may travel back through the optical fiber 108, until it reaches the second coupler 308. The first coupler 310 may be coupled to the second coupler 308 on one side by the optical fiber 332 such that the backscattered light 328 may pass from the first coupler 310 to the second coupler 308 through the optical fiber 332. The second coupler 308 may split the backscattered light 328 based on the number of interferometer arms so that one portion of any backscattered light 328 passing through the interferometer 302 travels through the top interferometer arm 324 and another portion travels through the bottom interferometer arm 322. In other words, the second coupler 308 may split the backscattered light from the optical fiber 332 into a first backscattered pulse and a second backscattered pulse. The first backscattered pulse may be sent into the top interferometer arm 324. The second backscattered pulse may be sent into the bottom interferometer arm 322. These two portions may be re-combined at the third coupler 334, after they have exited the interferometer 302, to form an interferometric signal.

The interferometer 302 may facilitate the generation of the interferometric signal through the relative phase shift variations between the light pulses in the top interferometer arm 324 and the bottom interferometer arm 322. Specifically, the gauge 323 may cause the length of bottom interferometer arm 322 to be longer than the length of top interferometer arm 324. With different lengths between the two arms of interferometer 302, the interferometric signal may include backscattered light from two positions along the fiber 108 such that a phase shift of backscattered light between the two different points along the fiber 108 can be identified in the interferometric signal. The distance between those points L may be half the length of the gauge 323 in the case of a Mach-Zehnder configuration, or equal to the gauge length in a Michelson interferometer configuration.

While the DAS VSP processing system 300 is running, the interferometric signal will typically vary over time. The variations in the interferometric signal may identify strains in the optical fiber 108 that are caused, for example, by seismic energy. By using the time of flight for the optical pulse 316, the location of the strain along the optical fiber 316 and the time at which it occurred can be determined. If the optical fiber 108 is positioned within a wellbore, the locations of the strains in the fiber 108 can be correlated with depths in the formation in order to associate the seismic energy with locations in the formation and wellbore.

To facilitate the identification of strains in the optical fiber 108, the interferometric signal may reach the photodetector assembly 320, where it may be converted to an electrical signal. The photodetector assembly may provide an electric signal proportional to the square of the sum of the two electric fields from the two arms of the interferometer. This signal is proportional to $P(t)=P_1+P_2+2*Sqrt(P_1P_2)cos(\phi_1-\phi_2)$ where $P_n$ is the power incident to the photodetector from a particular arm (1 or 2) and $\phi_n$ is the phase of the light from the particular arm of the interferometer. The photodetector assembly 320 may transmit the electrical signal to the information processing system 200, which may process the electrical signal to identify strains within the fiber 108 and/or convey the data to a display and/or store it in computer-readable media. The photodetector assembly 320 and the information processing system 200 may be communicatively and/or mechanically coupled. A first device may be communicatively coupled to a second device if it is connected to the second device through a wired or wireless communication network which permits the transmission of information. Thus, the information processing system 200 may be located uphole, downhole, or at a remote location. The information processing system 200 may also be communicatively or mechanically coupled to the pulse generator 314.

Modifications, additions, or omissions may be made to FIG. 3 without departing from the scope of the present disclosure. For example, FIG. 3 shows a particular configuration of components of system 300. However, any suitable configurations of components may be used. For example, a compensating interferometer may be placed in the launch path (i.e., prior to traveling down optical fiber 108) of the interrogating pulse to generate a pair of pulses that travel down optical fiber 108. In such embodiments, an interferometer may not be necessary to interfere the backscattered light from pulses prior to being sent to photo detector assembly. In one branch of the compensation interferometer in the launch path of the interrogating pulse, an extra length of fiber not present in the other branch (a gauge length similar to gauge 323 of FIG. 3) is used to delay one of the pulses. To accommodate phase detection of backscattered light using system 300, one of the two branches may include an optical frequency shifter (for example, an acousto-optic modulator) to shift the optical frequency of one of the pulses, while the other may include a gauge. This may allow using a single photodetector receiving the backscatter light to determine the relative phase of the backscatter light between two locations by examining the heterodyne beat signal received from the mixing of the light from different optical frequencies of the two interrogation pulses.

As another example, system 300 may generate interferometric signals for analysis by the information processing system 200 without the use of a physical interferometer. For instance, system 300 may direct backscattered light to photo detector assembly 320 without first passing it through any interferometer, such as interferometer 302 of FIG. 3. Alternatively, the backscattered light from the interrogation pulse may be mixed with the light from the laser originally providing the interrogation pulse. Thus, the light from the laser, the interrogation pulse, and the backscattered signal may all be collected by photodetector 320 and then analyzed by information processing system 200. The light from each of these sources may be at the same optical frequency in a homodyne phase demodulation system, or may be different optical frequencies in a heterodyne phase demodulator. This method of mixing the backscattered light with a local oscillator allows measuring the phase of the backscattered light along the fiber relative to a reference light source.

Furthermore, in particular embodiments, a continuously modulated interrogation signal may be emitted into the fiber instead of a pulse (e.g., pulse 316). For example a phase, frequency, or amplitude modulator following the laser may be used instead of a pulse generator (such as pulse generator 314) to send a coded or spread-spectrum interrogation signals down the optical fiber 108 to allow distributed seismic sensing using information processing system 200.

As described above, DAS may be used as a method for collecting seismic data of a formation. In particular embodiments, the collected seismic data using DAS techniques may be VSP data. To collect DAS VSP data, a source being activated at the surface of a wellbore may generate sound waves through the formation. Some examples of sources may include vibroseis, explosives (e.g., dynamite), air guns, thumper trucks, or any other suitable vibrational source for VSP data collection. These sound waves in the formation may cause strain changes of the optical fiber 108 in the fiber optic cable of the DAS system, and these strain changes may be measured using DAS systems like those described above. In particular, the DAS VSP processing system 300 may send optical pulses down the optical fiber 108 at a particular rate, portions of which may backscatter toward the optical pulse source at various positions of the optical fiber 108, as described above. These reflections may be measured at various times over finite time durations (which may coincide with the rate and duration of the optical pulse generation) to measure strain changes in the fiber optic cable at various depths.

Each measurement captured by the DAS VSP processing system 300 may be referred to as a "sweep." Although the measurements described above are generated using a vibrator as the seismic source, measurements and "sweeps" may refer to data collected from any single source being energized. Typically, after some source reset period and/or listen time, the energizing of the source is repeated to start a new recording for the new source position. Thus, a typical raw measurement record includes both sweep and listen time. Characteristics of the sound waves (e.g., amplitude and duration) received at the fiber, which may be referred to as acoustic activity, may be determined based, at least in part, on the measured strain changes. One sweep may comprise seismic data in the form of acoustic activity for all DAS measured depths along the wellbore over the finite time duration. The seismic data within a sweep may be de-multiplexed to generate traces (or channels) of the seismic data at the various data collection depths. The traces may indicate the seismic data at a particular depth in the wellbore over the time duration of the sweep. In various embodiments, each trace may be associated with a different activation of the source by the DAS data collection system 300. Using the information from one or more sweeps (source repetitions of the DAS data collection system 300), properties of the formation may be determined. For example, the speed of a formation (i.e., the speed of sound in the formation) may be determined. As another example, the seismic data may be used to form underground images.

The DAS data collection method described above may be a more efficient way of collecting the seismic data when compared with using traditional geophones to collect the same information. Data collection using geophones may require substantial time and physical effort as compared with the DAS method previously described. For example, geophones may need to be physically raised and/or lowered and source energizing may be repeated thereafter for every depth sample (channel) of seismic data collected, which may take minutes or hours to perform. In contrast, using DAS techniques as described, data for all depths may be collected by sending optical pulses every few milliseconds for a few seconds down a fiber optic cable in a wellbore (without the need to raise or lower the fiber optic cable). Advantageously, one source activation enables acquisition of the entire seismic data set covered by the optical fiber. As described above, Rayleigh scattering from random impurities in the optical waveguide occurs when the optical waveguide is deformed by mechanical/seismic waves induced by sources. Processing the time-of-flight of laser pulses enables the fiber to attain channel spacing of approximately 1 (one) meter, equivalent to a VSP receiver level. Thus, the density of samples is higher than conventional VSP, with data acquisition rates often as high as approximately 10 kHz.

However, unlike conventional measurements in 2C and 3C, DAS data measurement techniques utilize straightly deployed fiber optic cables, which are only responsive along one dimension (the fiber direction). Therefore, this approach does not allow to easily recover characteristics of the sound waves (i.e., amplitude) from different incident angles due to the lack of the other two components (dimensions). Moreover, it will be appreciated that the angular response of DAS VSP measurements of seismic/acoustic energy in a wellbore originating from a seismic source at the surface of the wellbore are substantially different from the angular response of measurements recorded by using a string of usually approximately equally spaced geophones and/or hydrophones. For example, hydrophones measure change in the pressure wavefield of the detected mechanical seismic waves that a seismic source creates at a particular point with respect to a particular direction. The hydrophones have an isotropic response to the incident wavefield. Geophones generally have a cosine response toward the incident p-wavefield, and the recorded amplitude in the seismic data is significantly decayed when the incident angle of wavefield is close to 90 degrees (cos(90°)=0). In a system having 2C/3C configurations available for geophone measurements the deterioration of signal's amplitude caused by the angular response can be minimized by rotating the axes to transform the seismic data with one component in parallel to the angle of incidence.

FIG. 4A illustrates an arbitrary angle of incidence. In FIG. 4A, a seismic raypath 402 is transmitted by a seismic source 401. An optical fiber 108 is a fiber that is at least partially positioned within a wellbore (i.e., wellbore 103 shown in FIGS. 1A-1C). θ represents the angle of incidence 404. It should be appreciated that Θ=0 for tangential incidence and Θ=±π/2 for perpendicular incidence.

FIG. 4B illustrates the comparison of the p-wave amplitude response of incident angles of FIG. 4A for geophone and DAS recording systems. Although not shown in FIG. 4B, the s-wave amplitude response of incident angles are sin θ and sin 2θ for geophone and DAS recording systems, respectively. The vertical axis 408 corresponds to the normalized amplitude of the seismic signal and represents the measured angular response as a function of the angle of incidence. The horizontal axis 406 is shown in radian measurements and represents the measured angle of incidence. A first curve 410 represents geophone measurements, while a second curve 412 represents DAS VSP measurements corresponding to an angular response with respect to the incident angle. Note the sharp decay of the angular response for DAS VSP measurements, especially at mid-ranged incident angles. For geophone measurements, angular response decreases from a normalized amplitude value of approximately 0.9 to approximately 0.2 when the angle of incidence is between 0.5 and 1.2 radians. For DAS VSP measurements the angular response decreases from a normalized amplitude value of approximately 0.75 to approximately 0.05 when the angle of incidence is between 0.5 and 1.2 radians, indicating that geophones generally have an angular response signal proportional to cosine, while the DAS VSP measurements generally have an angular response signal proportional to cosine squared regardless of casing, tubing or wireline arrangements (shown in FIGS. 1A-1C). Ultimately, the incident angle should be properly determined for optimized amplitude recovery from the angular response.

Figure 5:
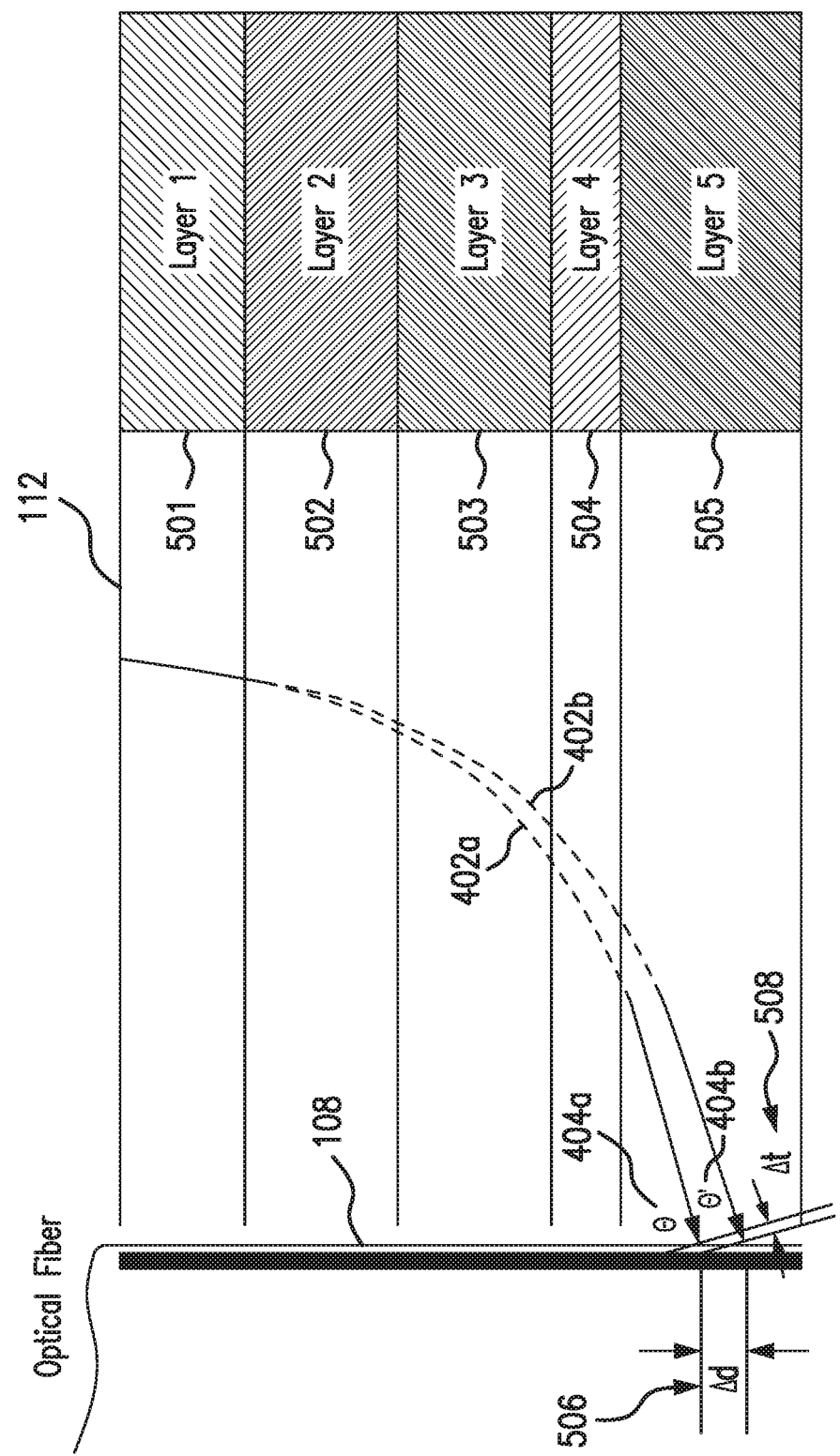
FIG. 5 illustrates an example of ray paths travelling through a flat layered formation from a finite-offset surface seismic source to a fiber optic cable deployed in a wellbore.

FIG. 5 illustrates an example of ray paths travelling through a flat layered formation from a finite-offset surface seismic source to a fiber optic cable deployed in a wellbore. In this example, two very close ray paths 402a and 402b travel from a finite-offset seismic source element configured to generate seismic waves and positioned at the surface 112 of the earth through five layers of formation 501-505 to the fiber optic cable 108 deployed downhole. The rays 402a and 402b may substantially bend as they travel through the different layers 501-505, and more particularly, may be spaced apart by Δd when impinging on the optical fiber 108. In other words, Δd 506 indicates the distance between two reference points with two defined incident angles θ 404a and θ' 404b from the same ray. In FIG. 5, the time the rays 402a and 402b "hit" the optical fiber 108 differs by Δt 508. Here, the difference in travelled distance Δd 506 and time Δt 508 are assumed to be very small. In this case, from the geometry of FIG. 5, the two incident angles θ 404a and θ' 404b can be assumed identical (θ≈θ'). The incident angle θ can then be determined by the following equation (2):

$$\cos\theta = \frac{\Delta t}{\Delta d \cdot S(d)}, \qquad (2)$$

where S(d) is the slowness profile along the wellbore as a function of depth d. It should be appreciated from Equation (2), that in order to compute the incident angle or its cosine function the information processing system 200 needs to determine two factors, which are the apparent slope of the acquired DAS VSP data $$\left(\frac{\Delta t}{\Delta d}\right)$$

and the slowness profile (S(d)).

Figure 6:
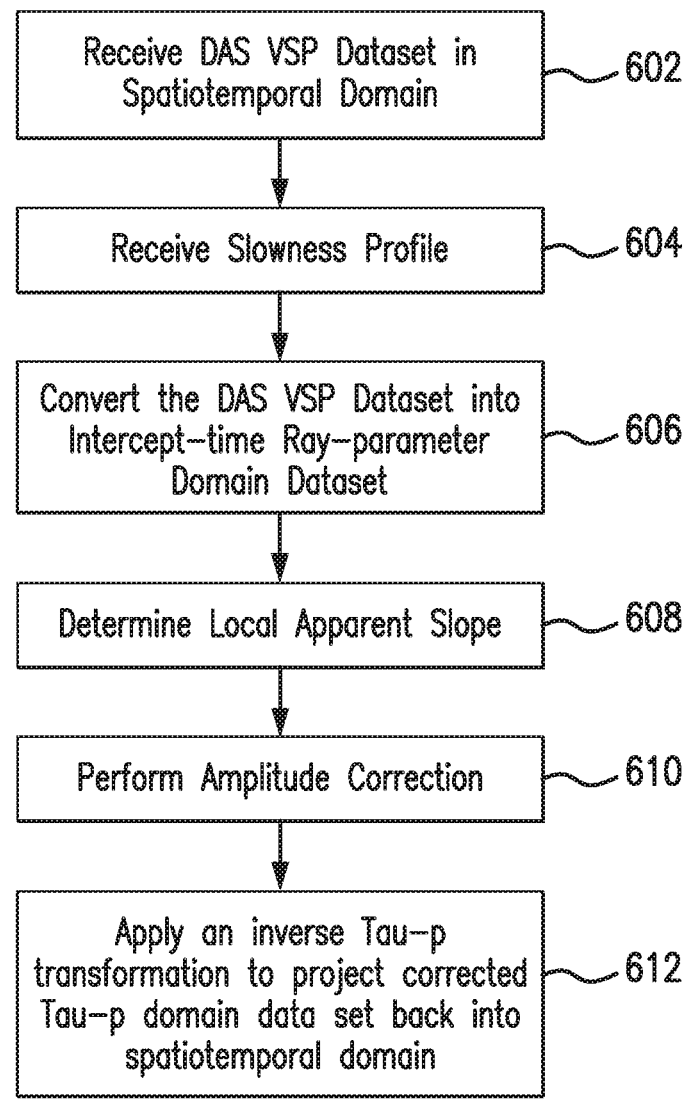
FIG. 6 is a flow diagram depicting a process of real-time and offline processing and compensating angular response for generating a quality VSP stack in accordance with one embodiment of the present disclosure.

FIG. 6 is a flow diagram depicting a process of real-time or offline processing and recovering the amplitude of seismic signals affected by the angular response for DAS VSP data set in accordance with one embodiment of the present disclosure. Before turning to description of FIG. 6, it is noted that the flow diagram in FIG. 6 shows examples in which operational steps are carried out in a particular order, as indicated by the lines connecting the blocks, but the various steps shown in this diagram can be performed in any order, or in any combination or sub-combination. It should be appreciated that in some embodiments some of the steps described below may be combined into a single step. In some embodiments, one or more steps may be omitted. In some embodiments, one or more additional steps may be performed. As will be appreciated by one skilled in the art, aspects of the present disclosure may be embodied as a method or computer program product. In some embodiments, the method described below may be performed, at least in part, by VSP survey control software module 208 depicted in FIG. 2.

According to an embodiment of the present disclosure, at step 602, the VSP survey control 208 may receive output seismic data stream corresponding to the wellbore 103 from the DAS system, for example. In various embodiments, the seismic data may comprise VSP data corresponding to the wellbore, formation, or tools within the wellbore. The VSP data may comprise a plurality of seismic traces, with each seismic trace associated with a depth in the wellbore 103. The VSP data may comprise data from one or more sweeps. For instance, where the VSP data is generated with a vibrator as a seismic source, the VSP data may comprise a plurality of sweeps that identify seismic data for the span of time corresponding to the time that the vibration source is engaged. In contrast, where the VSP data is generated with an explosive source that emits seismic energy over smaller time duration, the VSP data may comprise only one sweep. Furthermore, the received VSP data can include data associated with downgoing direct arrival waves, reflected upgoing primary waves, downgoing multiple reflected waves and reflected upgoing multiple reflected waves.

Figure 7:
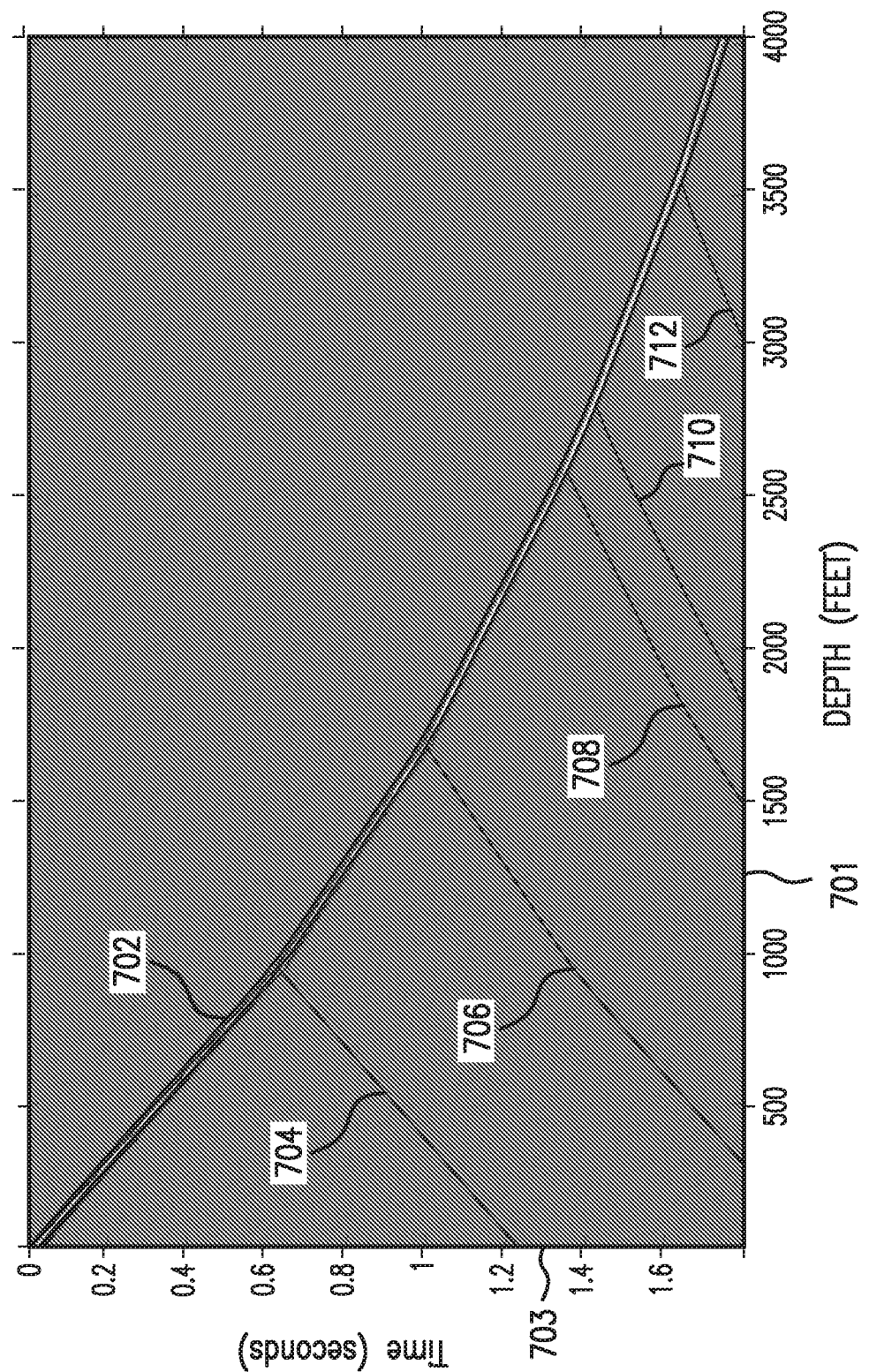
FIG. 7 illustrates an example of processed synthetic DAS VSP data set from the 5-layered model shown in FIG. 5.

FIG. 7 illustrates an example DAS VSP dataset in accordance with particular embodiments of the present disclosure. The DAS VSP dataset 700 comprises synthetic data representative of DAS VSP data that may be simulated by using a ray-tracing method on a multilayer velocity model, or other DAS VSP collection techniques within the scope of this disclosure. The DAS VSP dataset is shown along a time axis 703 and a depth axis 701. As indicated, in a manner dependent at least in part on characteristics of media in the geologic formation, such as formation comprising layers 501-505 depicted in FIG. 5, waves travel at velocities over distances such that relationships may exist between time and space. Thus, time information, as associated with sensed energy, may allow for understanding spatial relations of layers, interfaces, structures, etc. in a geologic formation. The DAS VSP dataset 700 illustrated in FIG. 7 includes one or more seismic traces 702, with each seismic trace being associated with a channel, or depth, in the wellbore 103. As depicted, the DAS VSP dataset 700 may comprise a stack of twenty raw sweeps. Each trace 702 may include acoustic (amplitude) activity acquired over time in response to seismic signals propagated through the formation.

When the seismic source is fired, an impulse wave, represented in FIG. 7 by a depth intersection of the event 702, travels down through the different formations of the earth. At each interface where the type of rock (layer) changes, a portion of that wave is reflected back toward the surface (referred to hereinafter as upgoing wavefield signals) and another portion is transmitted downwardly into the next earth layer (referred to hereinafter as downgoing wavefield signals). In FIG. 7, reference numerals 704-712 indicate the presence of the upgoing wavefield signals at corresponding layers of the formation.

As noted above, in order to compute the incident angle, the VSP survey control 208 needs to determine the slowness profile S(d) along the wellbore 103. In various embodiments, the slowness profile could be pre-determined by various methods and various sensor assemblies that are spaced apart by a predetermined distance.

In one embodiment, sonic data acquired by a sonic logging tool may be used by the DAS collection system 101 to determine the slowness profile. Sonic logging is an acoustic well logging tool that provides a formation's interval transit time, which is a measure of a formation's capacity to transmit seismic waves. Geologically, this capacity varies with lithology and rock textures, most notably decreasing with an increasing effective porosity. In other words, acoustic logging tools provide measurements of acoustic wave propagation speeds through the formation. This means that a sonic log can be used by the DAS collection system 101 to calculate the slowness profile by computing travel time of a local acoustic signal generated and received from a logging tool. In various embodiments, the acoustic logging tools may use separate processing flows to obtain the slowness values, and obtain the depth measurements using a natural gamma ray detector or other tools and sensors.

According to another embodiment, each waveform has a noise portion ($N_1$-$N_M$) that represents ambient noise signals recorded by each sensor (i.e. geophone sensor) and a signal portion ($S_1$-$S_M$) that represents the transmitted signal from the source as received by the sensors. The point on the waveform at the beginning of the signal portion is typically referred to as the "first break" or "first arrival" of the acoustic signal. The moveout or slowness of the waveforms can be determined in this embodiment by creating a line that intersects the first break of each waveform and taking the slope of that line. For instance, if zero offset geophone/DAS measurements are available, the DAS collection system 101 may provide slowness profiles by differentiating the first break travel times, using equation (3) below:

$$S(d) = \Delta t_{FB}/\Delta d_{FB}, \quad (3)$$

where $\Delta t_{FB}$ represents the time difference between the first break arrivals and $\Delta d_{FB}$ represents the distance difference between the first break arrivals.

Yet in another embodiment, a check shot survey may be used to obtain slowness profile values. The seismic check shot survey, also referred to as a seismic reference survey (SRS), is used as a calibration mechanism for the above-discussed reflection seismic data. In this survey, seismic velocities are measured in the borehole by recording the time required for a seismic signal generated by a surface energy source to reach a geophone anchored at different levels in the boreholes, typically spaced apart by approximately 100 meters or approximately 300 feet. Vertical seismic profiles are then made based on the full seismic trace received downhole at each detector. Automatically picking first break then provides the time-velocity-depth data that is later processed to display a relatively noise-free seismic section near the wellbore.

Referring back to FIG. 6, at step 604, the VSP survey control 208 obtains slowness profile values from the DAS collection system 101 collected using one of the methods described above.

The apparent slope of the acquired DAS VSP data is another factor needed by the VSP survey control 208 to compute the incident angles. According to an embodiment of the present invention, the apparent slope can be extracted by transforming the data acquired in step 602 to slope/direction-sensitive domain. Examples of such domains include any one or more of the following: tau-p (τ–p) (time-slowness) domain, curvelet domain, and the like.

The tau-p transform T[f] of a function f is defined by the following equation (4):

$$T[f](\tau,p) = \int f(\tau - xp, x) dx \qquad (4)$$

Taking the tau-p transform as an example of performed transformation, a slowness vector p determines the apparent slope $$\frac{\Delta t}{\Delta d},$$

i.e., $$p \triangleq \frac{\Delta t}{\Delta d}.$$

However, if the VSP survey control 208 performs a direct tau-p transform for the entire DAS VSP dataset obtained at step 602, the transformed data $\tilde{D}(\tau,p)$ would be substantially independent of time t and depth d variables, potentially preventing the VSP survey control 208 from obtaining correct angular response recovery. Hence, according to an embodiment of the present invention, the VSP survey control 208 implements the tau-p transform in a local manner (step 606), as shown in FIG. 8.

Figure 8:
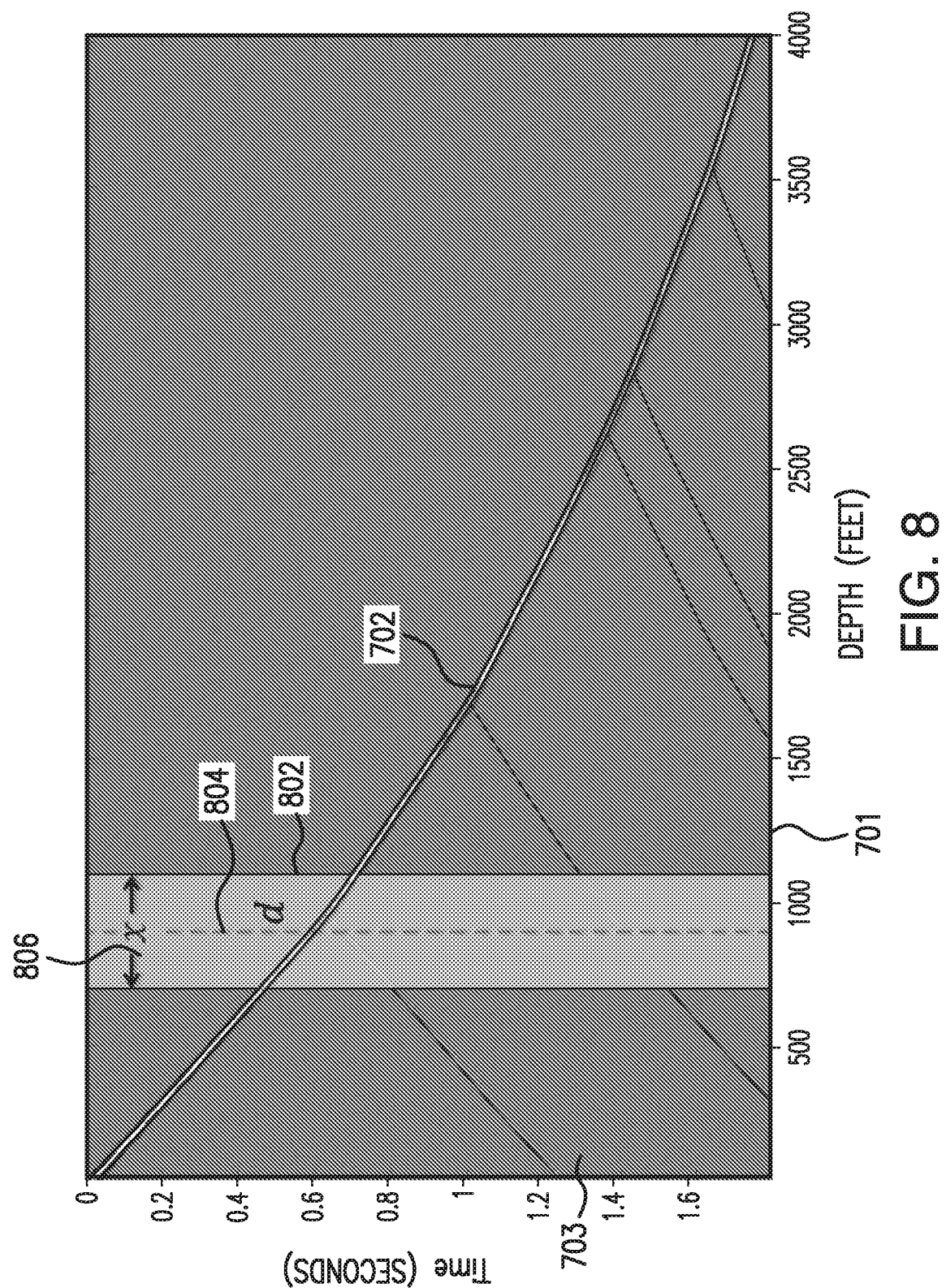
FIG. 8 is a schematic that illustrates the manner how the DAS VSP data set is divided into multiple stripe segments, in accordance with an embodiment of the present disclosure.

FIG. 8 is a schematic that illustrates the manner how the DAS VSP data set is divided into multiple stripes in accordance with an embodiment of the present disclosure. As depicted in FIG. 8, the VSP survey control 208 performs the local tau-p transform by first tailoring the acquired DAS VSP data set into a plurality of components 802 (referred to hereinafter as stripe segments) along the depth axis 701. According to an embodiment of the present invention, all stripe segments 802 will likely have uniform width 806 denoted as x in FIG. 8. However, it is obvious that one skilled in the art can use a varying width for each stripe as long as the width is wide enough (generally greater than 9 channels) to create a good transform but small enough (generally less than 50 channels) in order to preserve spatial resolution. Edges of each stripe segment 802 are equidistant with respect to a particular depth d 804. Moreover, it will be appreciated that the width of each stripe segment 802 is substantially small with respect to the entire depth of the well. For instance, in a well 4000 feet deep, the VSP survey control 208 may use stripe segment width values ranging from about 30 feet to about 150 feet to perform local tau-p transform. According to an embodiment of the present invention, the VSP survey control 208 determines local apparent slope for each of the created stripe segments 802 (step 608) based on arrival time of each seismic signal at the at least one optical fiber 108.

In this embodiment, the VSP survey control 208 uses local tau-p transforms of the received DAS VSP data in small stripe segments 802 for different depth values using equation (5) below:

$$\tilde{D}_d(\tau,p) = Taup_x(D(t,d)), \qquad (5)$$

where $Taup_x(\cdot)$ is the local tau-p transform with stripe segment 802 width x 806, D(t,d) is the DAS VSP data in the spatiotemporal domain received in step 602, and $\tilde{D}_d(\tau,p)$ is the corresponding transformed DAS VSP data in the local tau-p domain at depth d.

Next, at step 610, the VSP survey control 208 determines the corrected amplitude corresponding to the angular response $\tilde{D}_d^c(\tau,p)$ for each given depth value using equation (6):

$$\tilde{D}_a^c(\tau, p) = \frac{\tilde{D}_d(\tau, p)}{\cos^2\theta} = \frac{\tilde{D}_d(\tau, p)}{p^2} S(d)^2 \qquad (6)$$

where p is the slowness vector. However, the transform function in equation (6) has a singularity at p=0. Furthermore, excessive amplification of the noise level should be avoided. Thus, to facilitate lower amplification of the recovered signal for substantially small slowness values, the VSP control 208 may set a minimum slowness value (i.e., $N_{min}$), so that all of the smallest slowness values are forcibly pulled to $p_{min}$ during the performed local transform. In this step, the VSP survey control 208 utilizes the slowness profile values received in step 604, as discussed above.

It should be noted that examples and equations above each assumed that waves of only one type are being reflected, for example, P waves. However, the skilled person would know that the optical fiber 108 can be used to detect other seismic waves including Shear waves (S waves) and tube waves. In alternative embodiments of the present invention, step 610 may further involve determining the corrected amplitude for these types of waves. In this embodiment, the VSP survey control 208 transforms the DAS VSP data (in step 606) into a space in which events are separated based on velocity. Therefore, equation (6) can be expanded to apply to all types of waves:

$$\tilde{D}_d^c(\tau,p) = \tilde{D}_d(\tau,p) * A, \qquad (7)$$

where:

$$\text{For } |p| <= 1/V_p + \delta: A = \frac{1}{\cos^2\theta} = \frac{S_P(d)^2}{p^2} \qquad (8)$$

$$\text{For } |p| >= 1/V_p + \delta: A = \frac{1}{\sin 2\theta} = \frac{1}{2\sin\theta\cos(\theta)} = \frac{S_s(d)}{2p\sqrt{1 - \left(\frac{p}{S_s(d)}\right)^2}}, \qquad (9)$$

In other words, equation (7) represents a general solution where $\tilde{D}_d(\tau,p)$ represents a transformed dataset, A represents a correction factor and $\tilde{D}_d^c(\tau,p)$ represents the transformed corrected data set. In this embodiment, the VSP survey control 208 may use equation (8) to correct reflections of the P waves corresponding to a first predefined range of slope values (i.e., $|p|<=1/V_p+\delta$) and may use equation (9) to correct reflections of the S waves corresponding to a second predefined range of slope values (i.e., $|p|>=1/V_p+\delta$). S waves generally have a sin 2θ response toward the incident wavefield. Furthermore, $S_P(d)$ in equation (8) represents a local slowness profile of the P waves, $S_S(d)$ in equation (8) represents a local slowness profile of the S waves and δ represents a small offset in p value that provides a transition between P wave and S wave correction ranges. Thus, advantageously, the VSP survey control 208 performs the local correction of both wave types at the same time (in the same transform space) for each stripe segment 802. For very small values of p, applying the correction in equations (8) and (9) directly will cause a singularity (dividing by zero). For mediating this issue, a threshold level is defined for values of p, below which a small value is substituted for p. For example, a threshold value of $p_{min}$ could be set to $10^{-6}$ so that for all values of p smaller than $p_{min}$, the value of $10^{-6}$ will be substituted for p. It will be appreciated that in various embodiments, the VSP survey control 208 may modify the operating range of A to correct for tube waves as well, for which the amplitude correction is unity. In one embodiment, the VSP survey control 208 may perform a smooth transition of ranges of A values instead of a stepwise transition.

Next, at step 612, the VSP survey control 208 applies an inverse Tau-p transformation to project the corrected tau-p domain dataset back into spatiotemporal domain.

Figure 9:
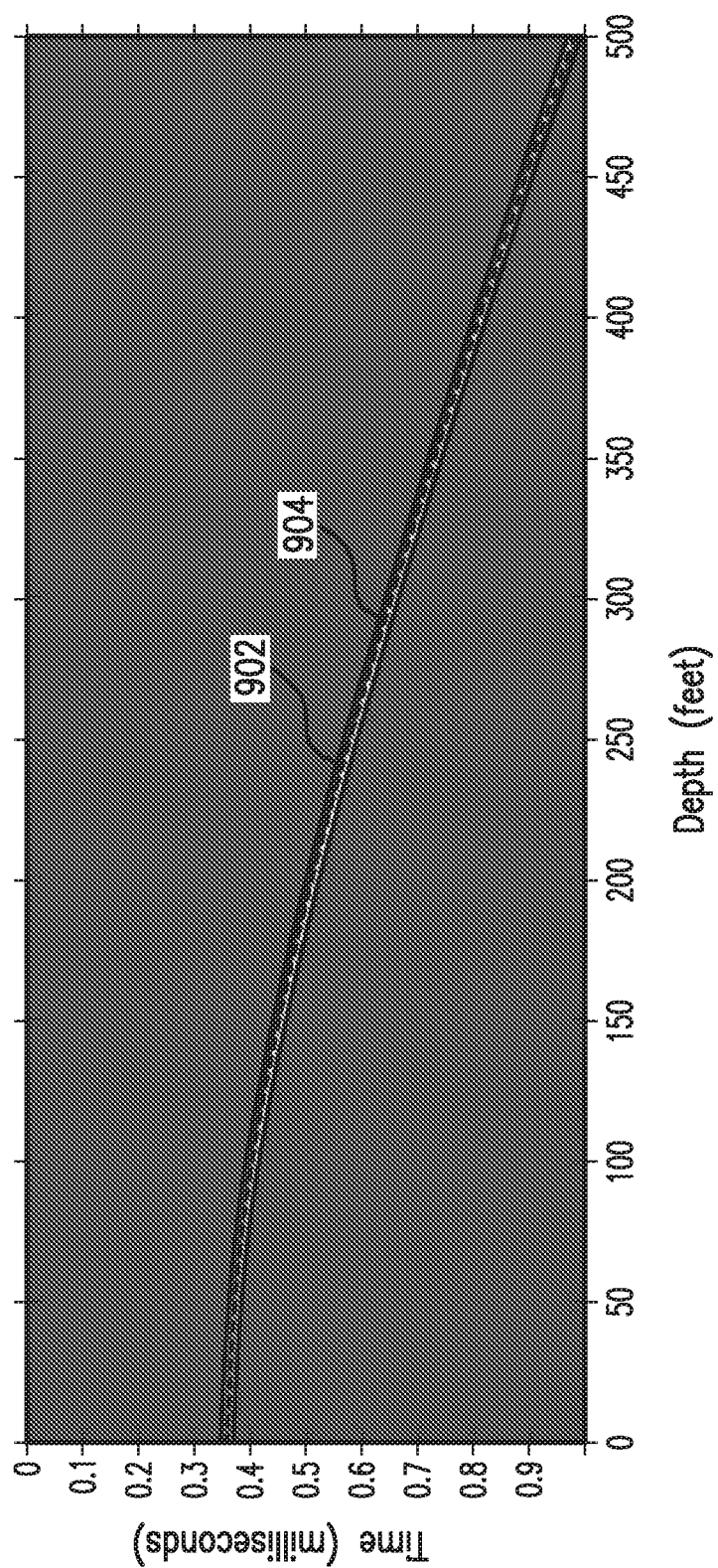
FIG. 9 is a synthetic example of DAS VSP data set with applied spherical divergence and angular response which can be used to test the disclosed embodiments.

To further illustrate various embodiments and to explain various principles and advantages all in accordance with the present disclosure, processing of synthetic records with $t^2$ divergence and angular response applied is compared with processing of records with corrected angular response. Starting with FIG. 9, there is shown an example of a DAS VSP data set acquired using a seismic source located approximately 200 feet away from the wellhead. In this case, the fiber optic cable such as the optical fiber 108 extends from depth of approximately 0 feet to approximately 500 feet. The subsurface formation is considered to be homogeneous, where the sound velocity is about 550 feet/sec. The seismic waves are typically spreading out in three dimensions, and the surface area on the expanding spherical wave increases in proportion to the radius squared. Thus, in this case the function $r^2$ has been used as a scaling factor. FIG. 9 shows the sample synthetic DAS VSP dataset with a 1-foot spatial sampling and a 1-millisecond temporal sampling of the downgoing wavefield to produce a seismic trace 902 and the corresponding 'first break' picks on refraction events 904 are overlaid. Since the velocity/slowness for the substantially homogeneous medium is known and the synthetic data is substantially noise-free, only the local slope is computed and its threshold $p_{min}$ is properly set. In this example, the threshold is set slightly greater than zero, such as $10^{-6}$ sec/meter.

According to an embodiment of the present invention, amplitude correction with respect to the incident angles for each channel is achieved by performing local tau-p transform as discussed above in conjunction with FIGS. 6 and 8. FIGS. 10A-10D illustrate the approach to identify the incident angles in τ–p domain, and the computed incident angles with respect to the channel depth using a synthetic DAS VSP example, in accordance with embodiments of the present invention; Starting with FIG. 10A, there are shown four exemplary events in a synthetic DAS VSP dataset. These events include a downgoing P-wave 1000, a downgoing S-wave 1002, an upgoing P-wave 1004 and an upgoing S-wave 1006.

Figure 10B:
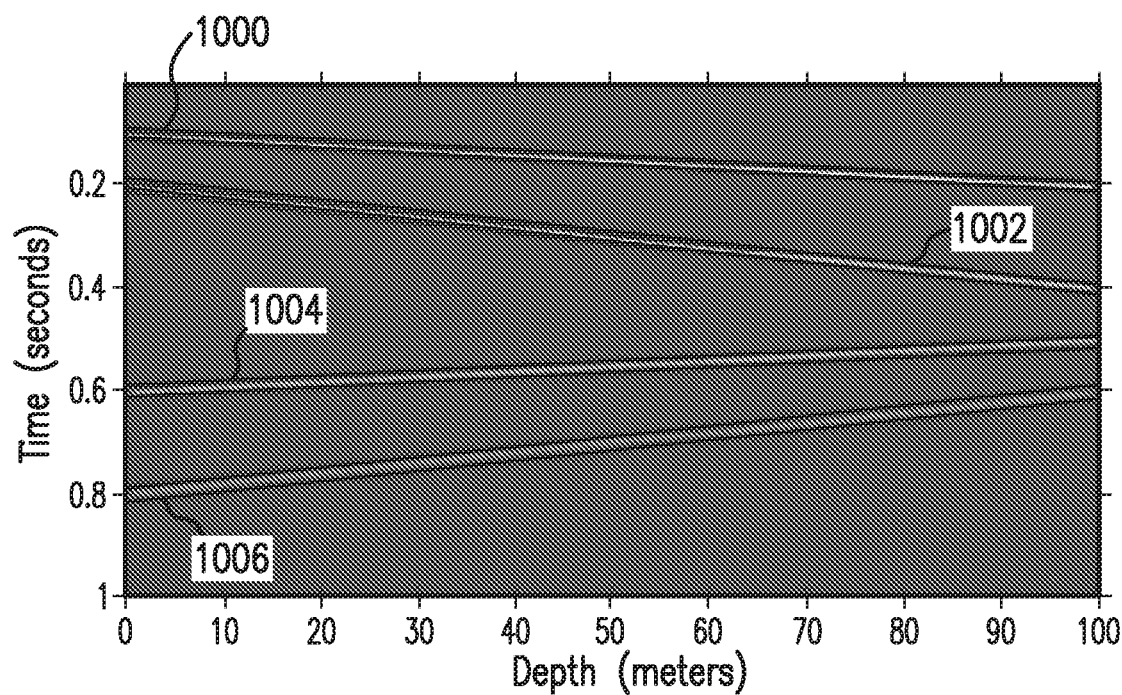
Figure 10B:
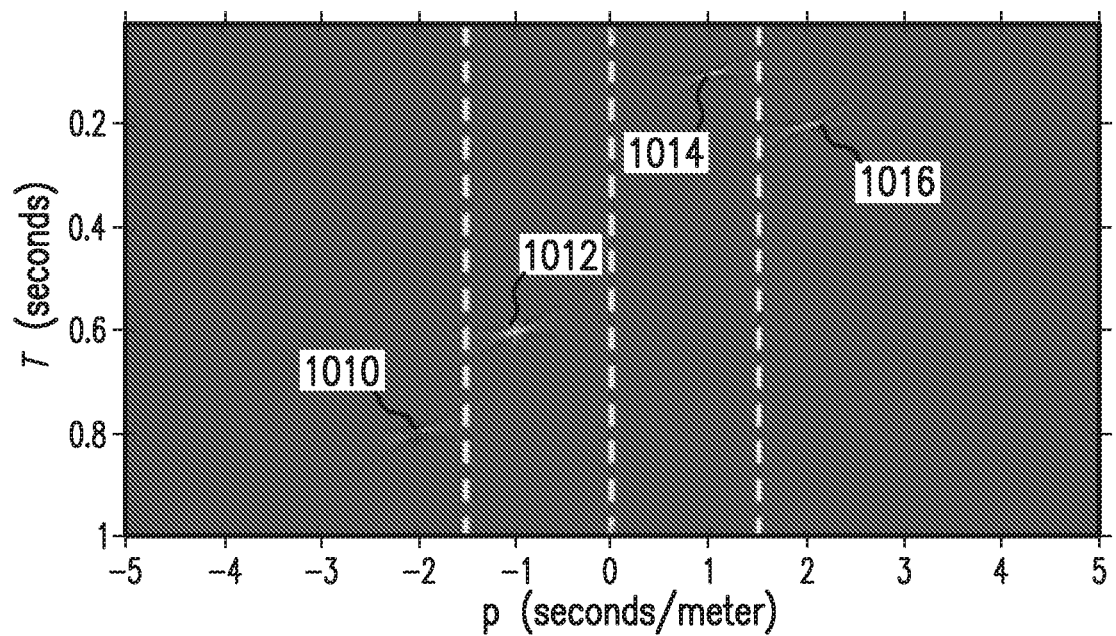

FIG. 10B shows the same DAS VSP data set only in tau-p domain. In this figure, events 1010, 1012, 1014,1016 correspond to events 1006, 1004, 1000, 1002 of FIG. 10A, respectively. Furthermore, FIG. 10B contains three dashed lines to help illustrate the four p zones corresponding to up and down going P-waves and S-waves in the corresponding striped segment, as described above. Downgoing P-waves are located between the dashed lines at p=0 and p=1.5. Upgoing P-waves are located between the dashed line at p=−1.5 and p=0. Downgoing S-waves are located to the right of p=1.5. Upgoing S-waves are located to the left of p=−1.5.

Figure 10D:
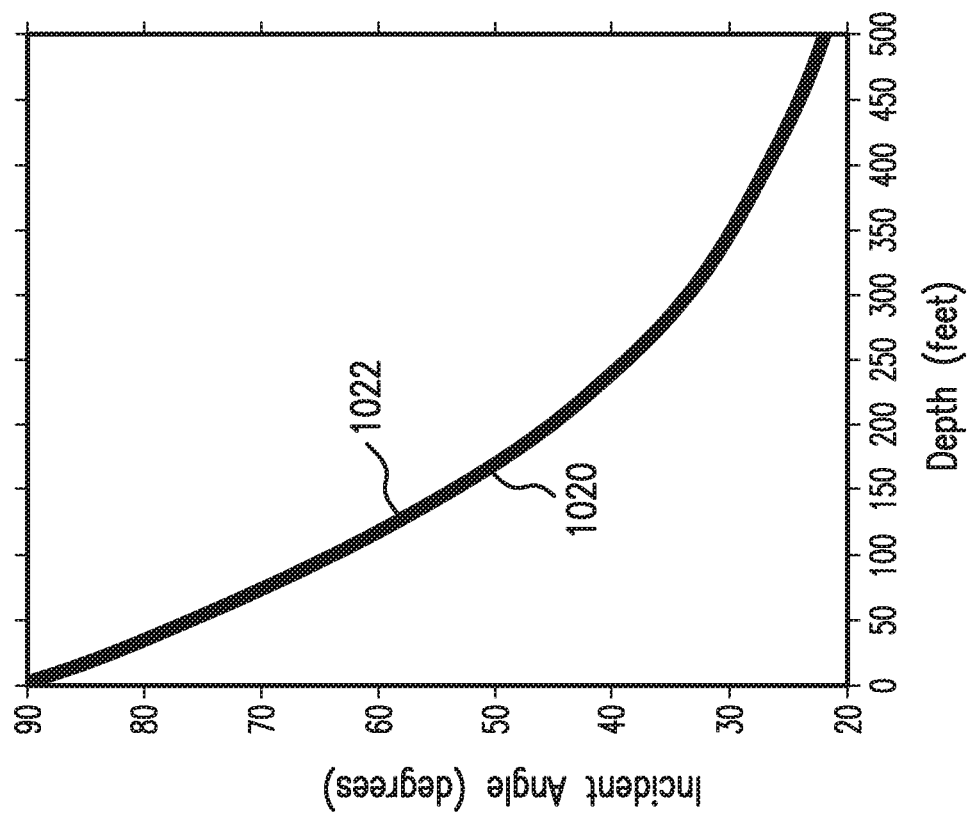
Figure 10C:
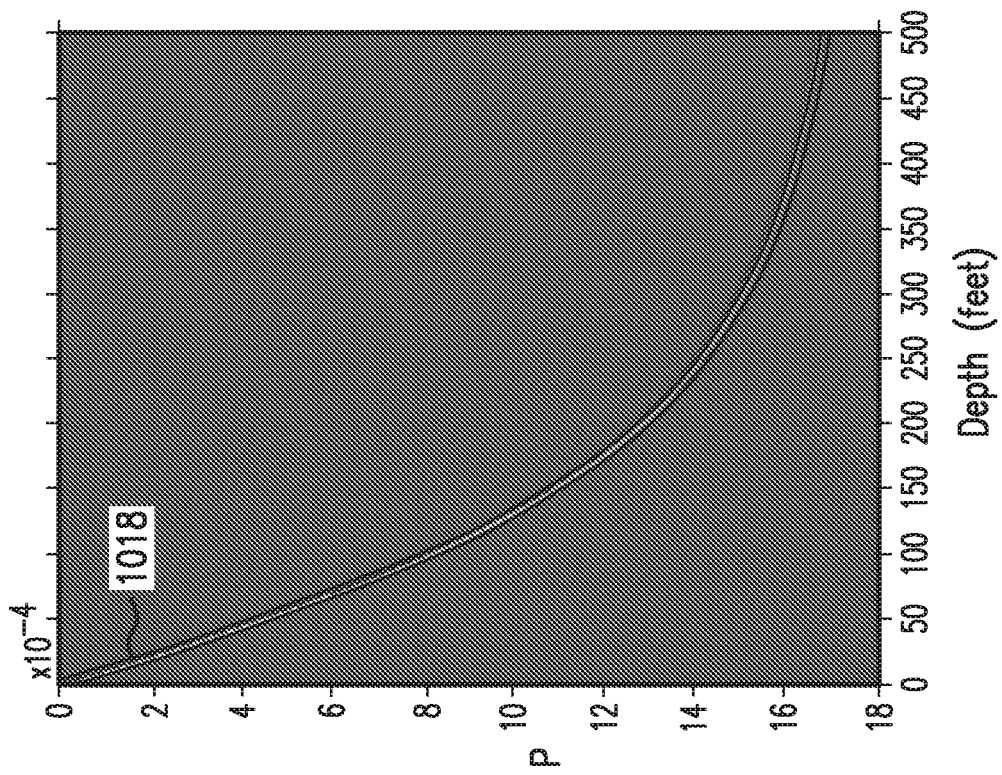

FIG. 10C illustrates a modified tau-p transform (Eq. 5) performed on the single P-wave event 902 on the synthetic DAS VSP dataset shown in FIG. 9. A series of tau-p transforms are computed, one for each stripe as described above. Each of these tau-p transforms are summed across the tau domain which creates a single trace for each of them in FIG. 10, corresponding to the center depth of each stripe. The resulting transformed P-wave event is shown as 1018 in FIG. 10C. The corresponding p value for each depth provides an estimate of the local slope of the event at each depth. FIG. 10D shows the relationship between the theoretical values and the local slope values (p) from FIG. 10C converted to the incident angles in accordance with an embodiment of the present invention. In this case a seismic source is also located approximately 200 feet away from the wellhead. A first curve 1020 depicts experimental values plotted as incident angle versus depth of the wellbore. A second trace 1022 depicts theoretical values also plotted as incident angle versus depth. Substantially complete overlap between the theoretical and experimental values indicates the validity of computational method described above in accordance with an embodiment of the present invention.

Figure 11:
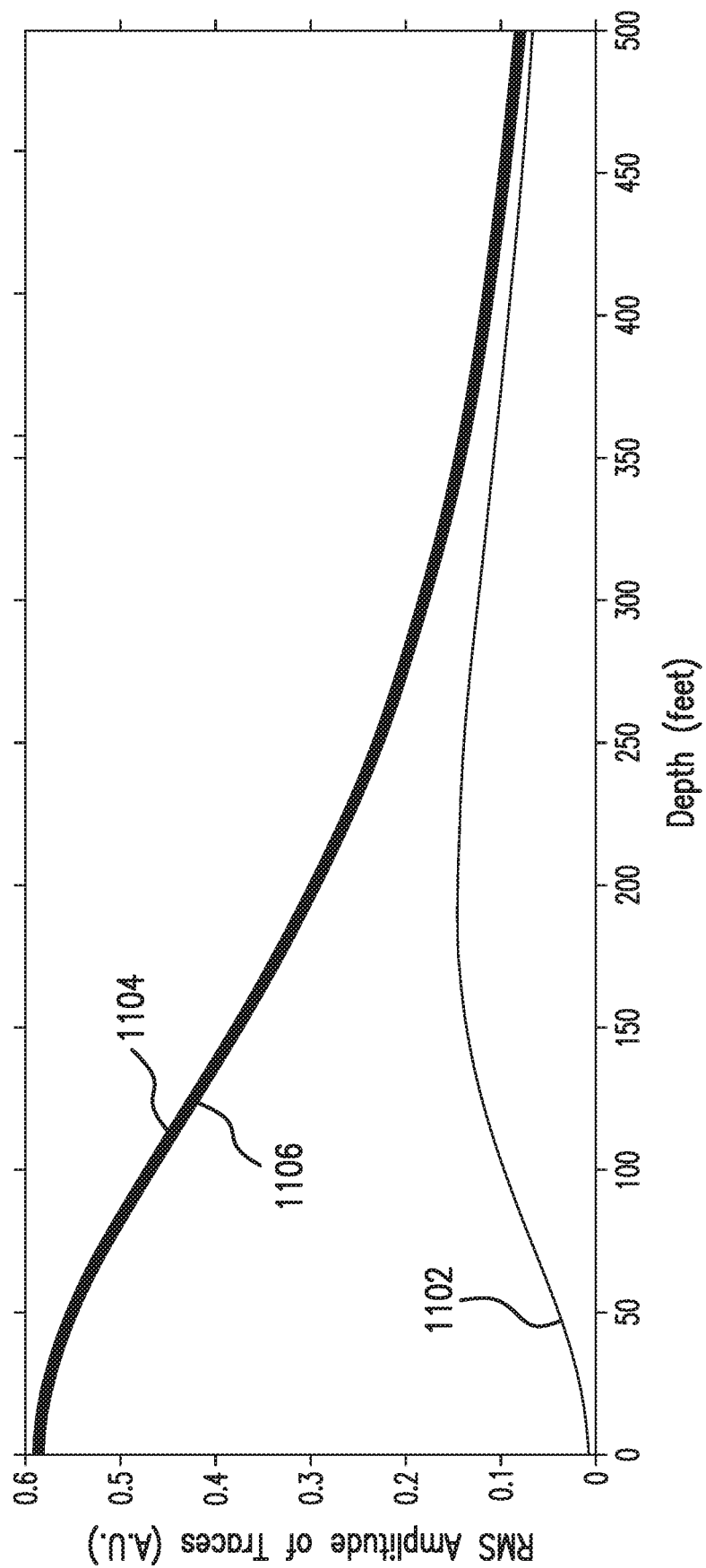
FIG. 11 illustrates comparison of seismic signal amplitudes before and after angular response compensation in accordance with embodiments of the present invention shown along a root mean square (RMS) amplitude axis and a depth axis.

FIG. 11 illustrates comparison of seismic signal traces before and after angular response compensation in accordance with embodiments of the present invention shown along a RMS amplitude axis and a depth axis. A first trace 1102 in FIG. 11 depicts RMS amplitude of the seismic signal before applying angular response compensation method described above versus depth. A second trace 1104 depicts recovered amplitude after applying the angular response compensation method in accordance with embodiments of the present invention plotted versus depth. A third trace 1006 depicts theoretical values corresponding to omnidirectional angular response. FIG. 11 clearly illustrates substantially full recovery of amplitude values at depth ranging between approximately 0 feet and approximately 500 feet. Furthermore, such recovered amplitude values substantially match the theoretical model as well. It should be noted that with respect to methods described above, trace at depth 0 feet is extrapolated using the data at nonzero shallow depth since this trace vanishes after using the angular response (because $\cos^2 90 = 0$).

Advantageously, the approach described above does not depend on the geology of the formation. In other words, angular response compensation can be performed by the VSP survey control 208 for all detected rays, irrespective of how these rays have travelled before impinging on the fiber optic cable 108. Also or alternatively, this approach can simply be applied to substantially any amplitude values, even if the angular response values are superposed with other amplitude factors, such as, but not limited to, spherical divergence, attenuation, scattering, etc. Because the correct portion of the signal amplitude will be isolated to its corresponding angle after direction-specific transforms described above are applied, this approach is applicable even if the events (i.e., downgoing direct arrival waves, reflected upgoing primary waves, downgoing multiple reflected waves and reflected upgoing multiple reflected waves) will cross. As described above, the angular response compensation method requires determination of the velocity/slowness profile only in the vicinity of the wellbore, and low seismic velocity anisotropy measurements are presumed in each layer of the formation near the wellbore. In the embodiments described above the tau-p transform is used for computing local apparent slopes. The tau-p transform changes the seismic data from the time-space domain to intercept-time ray-parameter domain. However, in other alternative embodiments, other transforms can be used to obtain a transformed up and down-going wavefield, such as, but not limited to, sparse tau-p transform (the variants of tau-p transform with L-1 norm constraint), curvelet transform, direct derivative, and the like.

Accordingly, as set forth above, the embodiments disclosed herein may be implemented in a number of ways. In general, in one aspect, the disclosed embodiments are directed to a system for processing DAS VSP surveys in real-time. The system includes, among other things, a distributed acoustic sensing (DAS) data collection system coupled to at least one optical fiber at least partially positioned within a wellbore and configured to activate a seismic source of energy or listen to a seismic source of energy for one or more times. The system additionally includes an information processing system communicatively coupled to the DAS data collection system. The information processing system includes a processor and a memory device coupled to the processor. The memory device contains a set of instructions that, when executed by the processor, cause the processor to receive a seismic dataset from the DAS data collection system. The seismic dataset includes a plurality of seismic data records that are each associated with a different activation of the source by the DAS data collection system to produce a seismic signal. The set of instructions, when executed by the processor, further cause the processor to i) receive slowness profile as a function of measured depth within the wellbore from the DAS data collection system or from a VSP processing system; ii) convert the seismic dataset into intercept-time ray-parameter domain dataset; iii) determine local apparent slope for each seismic signal in the received seismic dataset; iv) perform amplitude correction for the received seismic signals by using the slowness profile and the determined local apparent slope in the intercept-time ray-parameter domain dataset; and v) convert the corrected intercept-time ray-parameter domain dataset into the spatiotemporal domain.

In one or more embodiments, the fiber optic distributed sensing system may further include any of the following features individually or any two or more of these features in combination: a) the set of instructions that cause the processor to convert the seismic dataset into the intercept-time ray-parameter domain dataset further cause the processor to convert the seismic dataset into tau-p domain dataset; (b) the local apparent slope is determined based on arrival time of each seismic signal at the at least one optical fiber; (c) the set of instructions that cause the processor to convert the seismic dataset into the intercept-time ray-parameter domain dataset further cause the processor to divide each seismic data record in the dataset into multiple components, wherein each of the components is associated with a particular depth within the wellbore and wherein each of the components has a uniform width with respect to the particular depth; (d) the seismic signal comprises a combined seismic P-wave and seismic S-wave; (e) the set of instructions that cause the processor to convert the seismic dataset into the intercept-time ray-parameter domain dataset further cause the processor to separate seismic signals corresponding to the P-waves from the seismic signals corresponding to the S-waves based upon measured velocity of the seismic signals; (f) the set of instructions that cause the processor to perform incident angle correction further cause the processor to separately perform the incident angle correction for the seismic signals corresponding to the P-waves and for the seismic signals corresponding to the S-waves; and (g) the set of instructions that cause the processor to convert the seismic dataset into the intercept-time ray-parameter domain dataset further cause the processor to perform one of slant stack tau-p transform and sparse tau-p transform.

In general, in yet another aspect, the disclosed embodiments are related to a method for processing DAS VSP surveys to perform amplitude correction in real-time. The method includes, among other steps, the steps of repeatedly activating or listening to a seismic source of energy by a distributed acoustic sensing (DAS) data collection system coupled to at least one optical fiber at least partially positioned within a wellbore and sending an acquired seismic dataset from the DAS data collection system to an information processing system communicatively coupled to the DAS data collection system. The seismic dataset includes a plurality of seismic data records that are each associated with a different activation of the source by the DAS data collection system to produce a seismic signal. The method further includes the steps of: i) sending slowness profile as a function of measured depth within the wellbore from the DAS data collection system or from a VSP processing system to an information processing system; ii) converting, by the information processing system, the seismic dataset into intercept-time ray-parameter domain dataset; iii) determining, by the information processing system, local apparent slope for each seismic signal in the received seismic dataset; iv) performing, by the information processing system, amplitude correction for the received seismic signals by using the slowness profile and the determined local apparent slope in the intercept-time ray-parameter domain dataset; and v) converting, by the information processing system, the corrected intercept-time ray-parameter domain dataset into the spatiotemporal domain.

In one or more embodiments, the method for processing DAS VSP surveys to perform amplitude correction in real-time or offline processing may further include any one of the following features individually or any two or more of these features in combination: (a) the DAS data collection system including a data interrogation device communicatively coupled to one end of the at least one optical fiber and positioned at a surface of the earth; (b) the step of converting the seismic dataset into the intercept-time ray-parameter domain dataset further including the step of converting the seismic dataset into tau-p domain dataset; (c) the step of determining the local apparent slope based on arrival time of each seismic signal at the at least one optical fiber; and (d) the step of converting the seismic dataset into the intercept-time ray-parameter domain dataset further including dividing each seismic data record in the dataset into multiple components, wherein each of the components is associated with a particular depth within the wellbore and wherein each of the components has a uniform width with respect to the particular depth.

While particular aspects, implementations, and applications of the present disclosure have been illustrated and described, it is to be understood that the present disclosure is not limited to the precise construction and compositions disclosed herein and that various modifications, changes, and variations may be apparent from the foregoing descriptions without departing from the spirit and scope of the disclosed embodiments as defined in the appended claims.

What is claimed is:

1. A system, comprising:
 a distributed acoustic sensing (DAS) data collection system coupled to at least one optical fiber at least partially positioned within a wellbore and configured to activate a seismic source of energy or listen to a seismic source of energy for one or more times; and
 an information processing system communicatively coupled to the DAS data collection system, the information processing system comprising a processor and a memory device coupled to the processor, the memory device containing a set of instructions that, when executed by the processor, cause the processor to:

receive a seismic dataset from the DAS data collection system recorded in a spatiotemporal domain, the seismic dataset comprising a plurality of seismic data records that are each associated with a different activation of the source by the DAS data collection system to produce a seismic signal;

receive a slowness profile as a function of measured depth within the wellbore from the DAS data collection system or from a VSP processing system;

convert the seismic dataset into intercept-time ray-parameter domain dataset;

determine the local apparent slope for each seismic signal in the received seismic dataset;

perform amplitude correction for the received seismic signals by using the slowness profile and the determined local apparent slope in the intercept-time ray-parameter domain dataset; and convert the corrected intercept-time ray-parameter domain dataset into the spatiotemporal domain.

2. The system of claim 1, wherein the set of instructions that cause the processor to convert the seismic dataset into the intercept-time ray-parameter domain dataset further cause the processor to convert the seismic dataset into tau-p domain dataset.

3. The system of claim 2, wherein the local apparent slope is determined based on arrival time of each seismic signal at the at least one optical fiber.

4. The system of claim 2, wherein the set of instructions that cause the processor to convert the seismic dataset into the intercept-time ray-parameter domain dataset further cause the processor to divide each seismic data record in the dataset into multiple components, wherein each of the components is associated with a particular depth within the wellbore.

5. The system of claim 1, wherein the seismic signal comprises a seismic P wave, a seismic S wave, or a combination of them.

6. The system of claim 5, wherein the set of instructions that cause the processor to convert the seismic dataset into the intercept-time ray-parameter domain dataset further cause the processor to separate seismic signals corresponding to the P-waves from the seismic signals corresponding to the S-waves based upon measured velocity of the seismic signals.

7. The system of claim 6, wherein the set of instructions that cause the processor to perform amplitude correction further cause the processor to separately perform the amplitude correction for the seismic signals corresponding to the P-waves and for the seismic signals corresponding to the S-waves.

8. The system of claim 1, wherein the set of instructions that cause the processor to convert the seismic dataset into the intercept-time ray-parameter domain dataset further cause the processor to perform one of slant stack depth-varying tau-p transform and depth-varying sparse tau-p transform.

9. The system of claim 1, wherein the DAS data collection system comprises a data interrogation device communicatively coupled to one end of the at least one optical fiber and positioned at a surface of the earth.

10. The system of claim 6, wherein the slowness profile value is associated with S-waves or the slowness profile value is associated with P-waves and wherein the slowness profile is obtained using a zero offset, check shot VSP survey, or a sonic log.

11. A method for processing DAS VSP surveys to perform amplitude correction in real-time or offline, the method comprising:

activating a seismic source of energy or listening to a seismic source of energy by a distributed acoustic sensing (DAS) data collection system coupled to at least one optical fiber at least partially positioned within a wellbore;

sending an acquired seismic dataset from the DAS data collection system to an information processing system communicatively coupled to the DAS data collection system, the seismic dataset comprising a plurality of seismic data records that are each associated with a different activation of the source by the DAS data collection system to produce a seismic signal;

sending a slowness profile as a function of measured depth within the wellbore from the DAS data collection system or from a VSP processing system to an information processing system;

converting, by the information processing system, the seismic dataset into intercept-time ray-parameter domain dataset;

determining, by the information processing system, local apparent slope for each seismic signal in the received seismic dataset;

performing, by the information processing system, amplitude correction for the received seismic signals by using the slowness profile and the determined local apparent slope in the intercept-time ray-parameter domain dataset; and converting, by the information processing system, the corrected intercept-time ray-parameter domain dataset into the spatiotemporal domain.

12. The method of claim 11, wherein the DAS data collection system comprises a data interrogation device communicatively coupled to one end of the at least one optical fiber and positioned at a surface of the earth.

13. The method of claim 11, wherein converting the seismic dataset into the intercept-time ray-parameter domain dataset comprises converting the seismic dataset into tau-p domain dataset.

14. The method of claim 13, wherein the local apparent slope is determined based on arrival time of each seismic signal at the at least one optical fiber.

15. The method of claim 13, wherein converting the seismic dataset into the intercept-time ray-parameter domain dataset comprises dividing each seismic data record in the dataset into multiple components, wherein each of the components is associated with a particular depth within the wellbore.

16. The method of claim 11, wherein the seismic signal comprises a combined seismic P-wave and seismic S-wave.

17. The method of claim 16, wherein converting the seismic dataset into the intercept-time ray-parameter domain dataset comprises separating seismic signals corresponding to the P-waves from seismic signals corresponding to the S-waves based upon measured velocity of the seismic signals.

18. The method of claim 17, wherein performing amplitude correction comprises separately performing the amplitude correction for the seismic signals corresponding to the P-waves and for the seismic signals corresponding to the S-waves.

19. An information processing system communicatively coupled to a distributed acoustic sensing (DAS) data collection system, the information processing system comprising a processor and a memory device coupled to the processor, the memory device containing a set of instruction that, when executed by the processor, cause the processor to:
- receive an acquired seismic dataset from the DAS data collection system, the seismic dataset comprising a plurality of seismic data records that are each associated with a different activation time of a source or with a different listen time of a source by the DAS data collection system to produce a seismic signal;
- receive slowness profile as a function of measured depth within the wellbore from the DAS data collection system or from a VSP processing system;
- convert the seismic dataset into intercept-time ray-parameter domain dataset;
- determine local apparent slope for each seismic signal in the received seismic dataset;
- perform amplitude correction for the received seismic signals by using the slowness profile and the determined local apparent slope in the intercept-time ray-parameter domain dataset; and
- convert the corrected intercept-time ray-parameter domain dataset into the spatiotemporal domain.

20. The information processing system of claim 19, wherein the set of instructions that cause the processor to convert the seismic dataset into the intercept-time ray-parameter domain dataset further cause the processor to convert the seismic dataset into tau-p domain dataset.

* * * * *